United States Patent
Jhang et al.

(10) Patent No.: US 10,353,182 B1
(45) Date of Patent: Jul. 16, 2019

(54) OPTICAL IMAGING LENS

(71) Applicant: Genius Electronic Optical (Xiamen) Co., Ltd., Xiamen, Fujian (CN)

(72) Inventors: Jia-Sin Jhang, Taichung (TW); Ruyou Tang, Fujian (CN); Yongfeng Lai, Fujian (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 0 days.

(21) Appl. No.: 15/915,079

(22) Filed: Mar. 8, 2018

(30) Foreign Application Priority Data

Dec. 29, 2017 (CN) .......................... 2017 1 1481960

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC ........ G02B 13/0045; G02B 9/64; G02B 3/02; G02B 13/04
See application file for complete search history.

(56) References Cited

U.S. PATENT DOCUMENTS

2014/0376105 A1* 12/2014 Sekine ..................... G02B 3/04
359/708

* cited by examiner

*Primary Examiner* — William Choi
(74) *Attorney, Agent, or Firm* — Winston Hsu

(57) ABSTRACT

An optical imaging lens includes a first lens element to a seventh lens element. The optical-axis region of the object-side surface of the fourth lens element is concave, the periphery region of the image-side surface of the fifth lens element is concave and the optical-axis region of the image-side surface of the sixth lens element is concave. AAG is the sum of total six air gaps from the first lens element to the seventh lens element and G12 is the air gap between the first lens element and the second lens element to satisfy AAG/G12≤10.000.

20 Claims, 25 Drawing Sheets

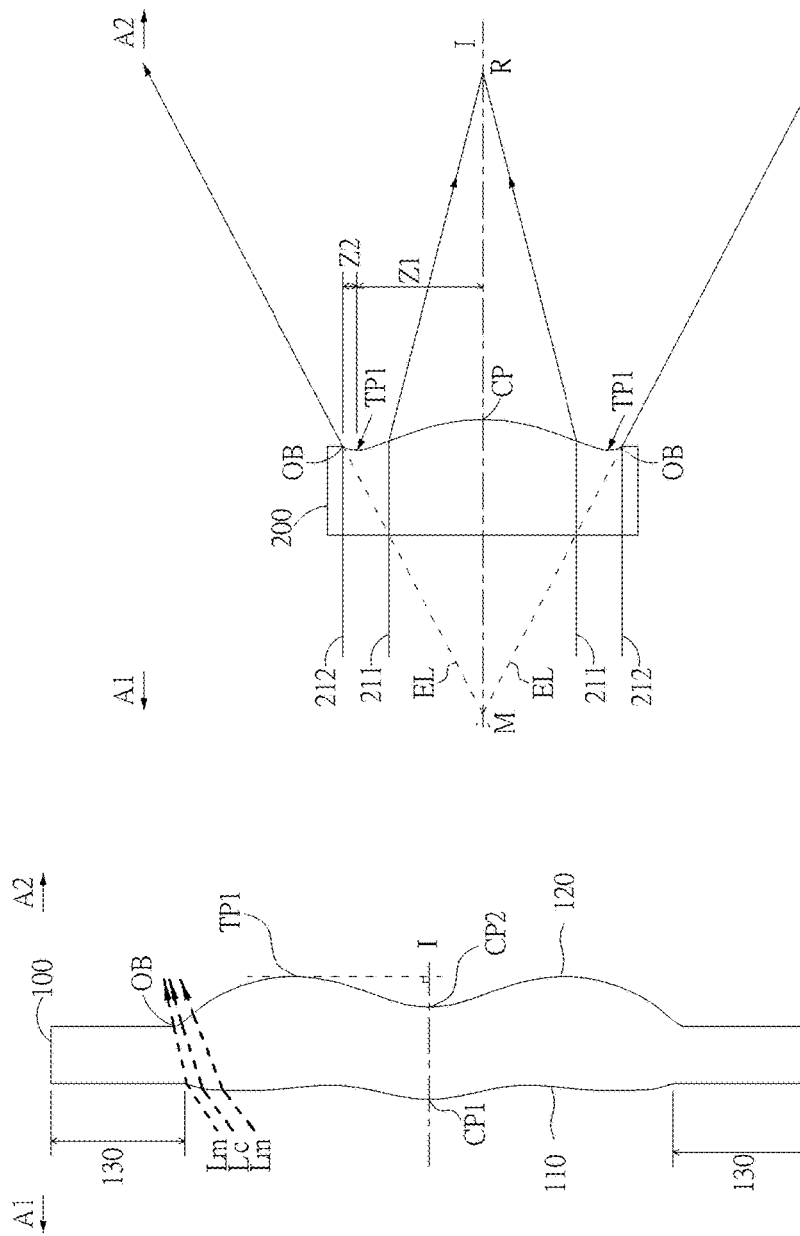

| First Example ||||||
|---|---|---|---|---|---|
| TTL=5.089mm; EFL=3.901mm; HFOV=40.360 Degrees; IMH=3.410mm; Fno=1.600 ||||||
| No. | Radius | Ape. Stop Lens Thickness Air Gap || Refractive Index | Abbe No. | Focal Length |
| Object |  | INFINITY |  |  |  |  |
| 80 First Lens |  | -0.419 |  |  |  |  |
| 11 |  | 2.098 | 0.645 | T1 | 1.545 | 55.987 | 7.048 |
| 12 Ape. Stop | 4.110 | 0.131 | G12 |  |  |  |
| 21 Second Lens | 1.760 | 0.288 | T2 | 1.642 | 22.409 | -27.998 |
| 22 |  | 1.501 | 0.220 | G23 |  |  |  |
| 31 Third Lens | 6.822 | 0.722 | T3 | 1.545 | 55.987 | 3.517 |
| 32 |  | -2.574 | 0.184 | G34 |  |  |  |
| 41 Fourth Lens | -1.775 | 0.260 | T4 | 1.642 | 22.409 | -3.927 |
| 42 |  | -6.222 | 0.078 | G45 |  |  |  |
| 51 Fifth Lens | -5.080 | 0.334 | T5 | 1.545 | 55.987 | 5.276 |
| 52 |  | -1.882 | 0.122 | G56 |  |  |  |
| 61 Sixth Lens | 1.997 | 0.319 | T6 | 1.642 | 22.409 | 15.429 |
| 62 |  | 2.339 | 0.571 | G67 |  |  |  |
| 71 Seventh Lens | -5.399 | 0.305 | T7 | 1.545 | 55.987 | -4.052 |
| 72 |  | 3.827 | 0.502 | G7F |  |  |  |
| 90 Filter | INFINITY | 0.210 |  | 1.517 | 64.167 |  |
|  | INFINITY | 0.197 |  |  |  |  |
| 91 Image Plane | INFINITY |  |  |  |  |  |

FIG. 20

| No. | 11 | 12 | 21 | 22 | 31 | 32 | 41 |
|---|---|---|---|---|---|---|---|
| K | 0.000000E+00 | 0.000000E+00 | 2.499693E-01 | -9.604546E-03 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | 1.007919E-02 | -6.377677E-02 | -1.917366E-01 | -1.160791E-01 | 1.565652E-02 | 3.328467E-02 | 5.014063E-02 |
| a6 | -1.607788E-03 | 3.071491E-02 | -4.711210E-02 | -1.155596E-01 | 2.331092E-04 | -8.326338E-02 | -1.737785E-02 |
| a8 | 1.460146E-02 | 2.697494E-03 | 1.752137E-02 | 1.349131E-01 | -1.886813E-02 | 6.557967E-02 | 3.963556E-02 |
| a10 | -1.472599E-02 | -1.531157E-02 | 3.960533E-02 | -6.579082E-02 | 2.338364E-03 | -2.431223E-02 | -5.351396E-03 |
| a12 | 7.690816E-03 | 1.553459E-02 | -3.048515E-02 | 1.071992E-02 | 6.676727E-03 | 3.406528E-03 | -3.971287E-03 |
| a14 | -9.012339E-04 | -3.567573E-03 | 5.847481E-03 | -4.190516E-03 | 1.078826E-03 | -3.762191E-04 | -7.976077E-05 |
| a16 | -4.867753E-05 | -2.145089E-03 | -2.995366E-03 | 1.621322E-03 | -9.292343E-05 | 5.930837E-04 | 9.198950E-04 |
| a18 | 0.000000E+00 | 0.000000E+00 | 0.000000E+00 | 0.000000E+00 | 0.000000E+00 | 0.000000E+00 | -3.387514E-04 |
| No. | 42 | 51 | 52 | 61 | 62 | 71 | 72 |
| K | 0.000000E+00 | 0.000000E+00 | 0.000000E+00 | -1.429284E+00 | -7.630337E-01 | 0.000000E+00 | -1.002716E-01 |
| a2 | 0.000000E+00 | 0.000000E+00 | 0.000000E+00 | 0.000000E+00 | 0.000000E+00 | 0.000000E+00 | 0.000000E+00 |
| a4 | -1.865020E-01 | -7.065761E-02 | 9.431219E-02 | -1.110866E-01 | -8.386758E-02 | -7.668234E-02 | -9.747972E-02 |
| a6 | 1.531119E-01 | 1.442800E-02 | -4.213629E-02 | 1.100181E-02 | -4.117811E-03 | 8.258046E-03 | 2.310255E-02 |
| a8 | -5.884928E-02 | -1.170388E-03 | 1.136950E-02 | -6.282057E-03 | 4.268872E-03 | 3.293396E-03 | -3.630361E-03 |
| a10 | 9.200087E-03 | 9.857939E-04 | 6.949851E-03 | 1.143950E-03 | -1.001834E-03 | 8.643551E-04 | 1.774712E-04 |
| a12 | 3.427895E-03 | -6.181074E-03 | -7.716984E-04 | 6.503632E-04 | 1.964085E-06 | -6.991521E-04 | 3.299348E-05 |
| a14 | -1.154980E-03 | 1.280895E-03 | -9.662608E-04 | -6.273958E-04 | 1.505962E-05 | 1.104385E-04 | -6.599431E-06 |
| a16 | -1.447963E-04 | 3.798264E-04 | 1.440991E-04 | 8.265777E-05 | 3.680945E-07 | -3.350798E-06 | 4.877003E-07 |
| a18 | 5.967974E-05 | -1.684325E-04 | 1.181685E-05 | -4.805896E-08 | 4.403342E-08 | -2.959581E-07 | -1.893909E-08 |

FIG. 21

| Second Example | | | | | |
|---|---|---|---|---|---|
| TTL=5.066mm; EFL=4.249mm; HFOV=40.360 Degrees; IMH=3.406mm; Fno=1.600 | | | | | |
| No. | Radius | Ape. Stop Lens Thickness Air Gap | | Refractive Index | Abbe No. | Focal Length |
| | Object | | INFINITY | | | |
| 80 | Ape. Stop | | -0.551 | | | |
| 11 | First Lens | 1.903 | 0.622 T1 | 1.545 | 55.987 | 6.060 |
| 12 | | 3.960 | 0.366 G12 | | | |
| 21 | Second Lens | 1.850 | 0.229 T2 | 1.642 | 22.409 | -27.100 |
| 22 | | 1.592 | 0.166 G23 | | | |
| 31 | Third Lens | 7.941 | 0.675 T3 | 1.545 | 55.987 | 3.688 |
| 32 | | -2.619 | 0.074 G34 | | | |
| 41 | Fourth Lens | -1.879 | 0.337 T4 | 1.642 | 22.409 | -3.782 |
| 42 | | -8.661 | 0.052 G45 | | | |
| 51 | Fifth Lens | -4.931 | 0.330 T5 | 1.545 | 55.987 | 5.454 |
| 52 | | -1.901 | 0.045 G56 | | | |
| 61 | Sixth Lens | 1.869 | 0.344 T6 | 1.642 | 22.409 | 12.972 |
| 62 | | 2.231 | 0.739 G67 | | | |
| 71 | Seventh Lens | -2.447 | 0.269 T7 | 1.545 | 55.987 | -2.543 |
| 72 | | 3.338 | 0.400 G7F | | | |
| 90 | Filter | INFINITY | 0.210 | 1.517 | 64.167 | |
| | | INFINITY | 0.208 | | | |
| 91 | Image Plane | INFINITY | | | | |

FIG. 22

| No. | 11 | 12 | 21 | 22 | 31 | 32 | 41 |
|---|---|---|---|---|---|---|---|
| K | 0.000000E+00 | 0.000000E+00 | 2.823087E-01 | -2.655904E-02 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | -1.410955E-03 | -3.841653E-02 | -1.864511E-01 | -1.241585E-01 | 2.320585E-02 | 2.843705E-02 | 5.898335E-02 |
| a6 | -4.173798E-03 | 1.687975E-02 | -5.031566E-02 | -1.158629E-01 | 2.962256E-03 | -7.883536E-02 | -2.165232E-02 |
| a8 | 1.548824E-02 | 4.867020E-03 | 9.015114E-02 | 1.384517E-01 | -2.129604E-02 | 6.839052E-02 | 3.906105E-02 |
| a10 | -1.495410E-02 | -1.719805E-02 | 4.076003E-02 | -6.424513E-02 | 3.140108E-03 | -2.393174E-02 | -5.058387E-03 |
| a12 | 7.391288E-03 | 1.367485E-02 | -2.755002E-02 | 1.092243E-02 | 6.870338E-04 | 3.103947E-03 | -3.993561E-03 |
| a14 | -1.111596E-03 | -2.892096E-03 | 5.685781E-03 | -4.478721E-03 | 1.034764E-03 | -3.002808E-04 | -1.399356E-04 |
| a16 | 1.229050E-06 | -4.526282E-04 | -1.645713E-03 | 1.346185E-03 | -3.110272E-04 | 6.005861E-04 | 8.336902E-04 |
| a18 | 0.000000E+00 | 0.000000E+00 | 0.000000E+00 | 0.000000E+00 | 0.000000E+00 | 0.000000E+00 | -3.785439E-04 |

| No. | 42 | 51 | 52 | 61 | 62 | 71 | 72 |
|---|---|---|---|---|---|---|---|
| K | 0.000000E+00 | 0.000000E+00 | 0.000000E+00 | -2.172785E+00 | -1.333025E+00 | 0.000000E+00 | -3.173591E+04 |
| a2 | 0.000000E+00 | 0.000000E+00 | 0.000000E+00 | 0.000000E+00 | 0.000000E+00 | 0.000000E+00 | 0.000000E+00 |
| a4 | -1.872266E-01 | -6.271247E-02 | 1.102101E-01 | -1.030197E-01 | -9.062713E-02 | -5.465285E-02 | -5.861971E-02 |
| a6 | 1.547668E-01 | 2.173323E-02 | -4.367996E-02 | 1.684697E-02 | -1.321547E-03 | 9.952890E-03 | 2.025912E-02 |
| a8 | -5.878757E-02 | -2.305832E-03 | 1.130122E-02 | -7.595853E-03 | 4.073487E-03 | 3.208704E-03 | -3.444766E-03 |
| a10 | 9.252767E-03 | 1.004740E-02 | 6.898610E-03 | 1.655289E-03 | -9.841152E-04 | 8.996456E-04 | 1.593509E-04 |
| a12 | 3.493142E-03 | -6.186861E-03 | -7.728527E-04 | 6.216743E-04 | 1.716773E-05 | -6.984034E-04 | 3.038489E-05 |
| a14 | -1.175413E-03 | 1.306029E-03 | -9.674752E-04 | -6.216687E-04 | 1.380484E-05 | 1.099344E-04 | -6.378547E-06 |
| a16 | -1.739867E-04 | 3.856785E-04 | 1.432294E-04 | 1.001598E-04 | -3.764702E-07 | -3.395067E-06 | 5.036908E-07 |
| a18 | 5.095545E-05 | -1.802429E-04 | 1.209023E-05 | 4.776898E-06 | 2.038407E-07 | -2.735899E-07 | -1.468851E-08 |

FIG. 23

| | | Third Example | | | | |
|---|---|---|---|---|---|---|
| | TTL=5.497mm; EFL=4.168mm; HFOV=40.363 Degrees; IMH=3.390mm; Fno=1.600 | | | | | |
| No. | | Radius | Ape. Stop Lens Thickness Air Gap | | Refractive Index | Abbe No. | Focal Length |
| | Object | | INFINITY | | | | |
| 80 | Ape. Stop | | -0.503 | | | | |
| 11 | First Lens | 1.981 | 0.695 | T1 | 1.545 | 55.987 | 6.082 |
| 12 | | 4.301 | 0.380 | G12 | | | |
| 21 | Second Lens | 1.830 | 0.170 | T2 | 1.642 | 22.409 | -37.349 |
| 22 | | 1.639 | 0.148 | G23 | | | |
| 31 | Third Lens | 10.703 | 0.932 | T3 | 1.545 | 55.987 | 3.878 |
| 32 | | -2.560 | 0.052 | G34 | | | |
| 41 | Fourth Lens | -1.963 | 0.342 | T4 | 1.642 | 22.409 | -4.205 |
| 42 | | -7.528 | 0.032 | G45 | | | |
| 51 | Fifth Lens | -4.676 | 0.347 | T5 | 1.545 | 55.987 | 5.583 |
| 52 | | -1.894 | 0.124 | G56 | | | |
| 61 | Sixth Lens | 2.869 | 0.477 | T6 | 1.642 | 22.409 | 16.790 |
| 62 | | 3.643 | 0.444 | G67 | | | |
| 71 | Seventh Lens | -4.194 | 0.445 | T7 | 1.545 | 55.987 | -3.376 |
| 72 | | 3.414 | 0.511 | G7F | | | |
| 90 | Filter | INFINITY | 0.210 | | 1.517 | 64.167 | |
| | | INFINITY | 0.188 | | | | |
| 91 | Image Plane | INFINITY | | | | | |

FIG. 24

| No. | 11 | 12 | 21 | 22 | 31 | 32 | 41 |
|---|---|---|---|---|---|---|---|
| K | 0.000000E+00 | 0.000000E+00 | 1.305671E-01 | -1.338987E-01 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | -2.716924E-04 | -3.826487E-02 | -1.950427E-01 | -1.278934E-01 | 2.404290E-02 | 2.615153E-02 | 5.448030E-02 |
| a6 | -5.283395E-03 | 3.092497E-02 | -5.214874E-02 | -1.114054E-01 | 6.517124E-03 | -8.067115E-02 | -2.460008E-02 |
| a8 | 1.611343E-02 | -3.733193E-03 | 1.291875E-02 | 1.385070E-01 | -2.161704E-02 | 6.620524E-02 | 3.498353E-02 |
| a10 | -1.403239E-02 | -1.949133E-02 | 4.320025E-02 | -6.535650E-02 | 3.060136E-03 | -2.338725E-02 | -7.335933E-03 |
| a12 | 6.932742E-03 | 1.634346E-02 | -2.930107E-02 | 1.157776E-02 | 1.392652E-03 | 2.399321E-03 | -3.966616E-03 |
| a14 | -1.237287E-03 | -1.492942E-03 | 4.897305E-03 | -4.075655E-03 | 1.115890E-03 | -4.388451E-04 | 2.442928E-04 |
| a16 | 3.817332E-05 | -1.599163E-03 | -2.295318E-03 | 1.485250E-03 | -3.540030E-04 | 4.332549E-04 | 8.948450E-04 |
| a18 | 0.000000E+00 | 0.000000E+00 | 0.000000E+00 | 0.000000E+00 | 0.000000E+00 | 0.000000E+00 | -3.342471E-04 |

| No. | 42 | 51 | 52 | 61 | 62 | 71 | 72 |
|---|---|---|---|---|---|---|---|
| K | 0.000000E+00 | 0.000000E+00 | 0.000000E+00 | -2.250047E+00 | -1.746720E+00 | 0.000000E+00 | -2.877795E-01 |
| a2 | 0.000000E+00 | 0.000000E+00 | 0.000000E+00 | 0.000000E+00 | 0.000000E+00 | 0.000000E+00 | 0.000000E+00 |
| a4 | -1.901922E-01 | -7.187074E-02 | 1.045152E-01 | -1.044565E-01 | -8.517505E-02 | -6.874950E-02 | -8.653267E-02 |
| a6 | 1.462663E-01 | 1.440665E-02 | -4.418866E-02 | 1.407275E-02 | -4.944968E-04 | 7.456744E-04 | 2.427459E-02 |
| a8 | -5.926508E-02 | -2.405593E-03 | 1.125512E-02 | -6.016547E-03 | 4.438387E-03 | 3.080181E-03 | -3.902538E-03 |
| a10 | 8.769077E-03 | 1.029067E-02 | 6.898732E-03 | 1.682184E-03 | -9.428997E-04 | 9.068535E-04 | 2.035624E-04 |
| a12 | 3.507991E-03 | -6.164380E-03 | -7.695904E-04 | 6.879195E-04 | 1.594952E-05 | -6.958185E-04 | 3.110594E-05 |
| a14 | -1.188174E-03 | 1.350394E-03 | -9.653122E-04 | -6.044752E-04 | 1.284541E-05 | 1.101525E-04 | -6.535008E-06 |
| a16 | -1.729619E-04 | 3.824320E-04 | 1.444620E-04 | 9.792810E-05 | -4.793926E-07 | -3.441736E-06 | 4.603274E-07 |
| a18 | 5.336768E-05 | -1.943422E-05 | 1.262810E-05 | 2.408237E-06 | 1.259097E-07 | -2.824577E-07 | -1.286351E-08 |

FIG. 25

| Fourth Example | | | | | | |
|---|---|---|---|---|---|---|
| TTL=5.322mm; EFL=3.912mm; HFOV=40.360 Degrees; IMH=3.395mm; Fno=1.600 | | | | | | |
| No. | | Radius | Ape. Stop Lens Thickness Air Gap | | Refractive Index | Abbe No. | Focal Length |
| | Object | | INFINITY | | | | |
| 80 | Ape. Stop | | -0.421 | | | | |
| 11 | First Lens | 2.038 | 0.563 | T1 | 1.545 | 55.987 | 6.544 |
| 12 | | 4.279 | 0.322 | G12 | | | |
| 21 | Second Lens | 1.811 | 0.214 | T2 | 1.642 | 22.409 | -25.109 |
| 22 | | 1.554 | 0.165 | G23 | | | |
| 31 | Third Lens | 8.606 | 0.937 | T3 | 1.545 | 55.987 | 3.534 |
| 32 | | -2.393 | 0.147 | G34 | | | |
| 41 | Fourth Lens | -1.792 | 0.388 | T4 | 1.642 | 22.409 | -4.073 |
| 42 | | -6.067 | 0.035 | G45 | | | |
| 51 | Fifth Lens | -5.106 | 0.359 | T5 | 1.545 | 55.987 | 5.258 |
| 52 | | -1.884 | 0.087 | G56 | | | |
| 61 | Sixth Lens | 2.119 | 0.333 | T6 | 1.642 | 22.409 | 12.368 |
| 62 | | 2.704 | 0.525 | G67 | | | |
| 71 | Seventh Lens | -4.463 | 0.263 | T7 | 1.545 | 55.987 | -3.605 |
| 72 | | 3.598 | 0.511 | G7F | | | |
| 90 | Filter | INFINITY | 0.210 | | 1.517 | 64.167 | |
| | | INFINITY | 0.265 | | | | |
| 91 | Image Plane | INFINITY | | | | | |

FIG. 26

| No. | 11 | 12 | 21 | 22 | 31 | 32 | 41 |
|---|---|---|---|---|---|---|---|
| K | 0.000000E+00 | 0.000000E+00 | 2.490147E-01 | -2.314302E-02 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | -5.650311E-04 | -4.341822E-02 | -1.912295E-01 | -1.224167E-01 | 2.603325E-02 | 2.905401E-02 | 5.767205E-02 |
| a6 | -2.819633E-03 | 2.087542E-02 | -4.833980E-02 | -1.164680E-01 | 1.071204E-03 | -7.775385E-02 | -2.423979E-02 |
| a8 | 1.639850E-02 | 6.977308E-03 | 1.115788E-02 | 1.358759E-02 | -2.121023E-02 | 6.782778E-02 | 3.792555E-02 |
| a10 | -1.498861E-02 | -1.601557E-02 | 4.232345E-02 | -6.558050E-02 | 3.637146E-03 | -2.446989E-02 | -5.616897E-03 |
| a12 | 7.365215E-03 | 1.356094E-02 | -2.805033E-02 | 1.067274E-02 | 1.189830E-03 | 2.812991E-03 | -4.268563E-03 |
| a14 | -7.164807E-04 | -3.674412E-03 | 4.621456E-03 | -4.273026E-03 | 1.211348E-03 | -4.365807E-04 | -1.589410E-04 |
| a16 | -9.165145E-05 | -4.707376E-04 | -3.227744E-03 | 1.691774E-03 | -3.336848E-04 | 5.282407E-04 | 9.426508E-04 |
| a18 | 0.000000E+00 | 0.000000E+00 | 0.000000E+00 | 0.000000E+00 | 0.000000E+00 | 0.000000E+00 | -2.564554E-04 |
| No. | 42 | 51 | 52 | 61 | 62 | 71 | 72 |
| K | 0.000000E+00 | 0.000000E+00 | 0.000000E+00 | -1.779880E+00 | -4.439793E-01 | 0.000000E+00 | 3.128773E-01 |
| a2 | 0.000000E+00 | 0.000000E+00 | 0.000000E+00 | 0.000000E+00 | 0.000000E+00 | 0.000000E+00 | 0.000000E+00 |
| a4 | -1.948570E-01 | -6.920206E-02 | 1.082017E-01 | -1.025663E-01 | -7.776775E-02 | -6.567802E-02 | -8.896225E-02 |
| a6 | 1.526599E-01 | 1.887575E-02 | -4.447375E-02 | 1.607994E-02 | -2.882349E-03 | 8.893327E-03 | 2.240320E-02 |
| a8 | -5.992654E-02 | -2.619694E-03 | 1.098248E-02 | -7.143698E-03 | 3.973038E-03 | 3.140399E-03 | -3.542492E-03 |
| a10 | 8.976377E-03 | 9.843631E-03 | 6.843976E-03 | 1.711020E-03 | -9.741091E-04 | 8.896063E-04 | 1.813623E-04 |
| a12 | 3.491749E-03 | -6.339077E-03 | -7.711339E-04 | 6.196832E-04 | 1.573060E-04 | -7.006706E-05 | 3.266318E-05 |
| a14 | -1.153101E-03 | 1.249427E-03 | -9.626594E-04 | -6.219664E-04 | 1.226894E-04 | 1.094954E-05 | -6.513029E-06 |
| a16 | -1.689602E-04 | 3.761761E-04 | 1.456352E-04 | 9.909848E-05 | -7.583454E-07 | -3.463529E-06 | 4.734576E-07 |
| a18 | 4.717548E-05 | -1.741934E-04 | 1.306235E-05 | 3.566609E-06 | 1.539193E-07 | -2.804090E-07 | -1.650448E-08 |

FIG. 27

| | Fifth Example | | | | | |
|---|---|---|---|---|---|---|
| | TTL=5.690mm; EFL=4.100mm; HFOV=40.360 Degrees; IMH=3.399mm; Fno=1.600 | | | | | |
| No. | | Radius | Ape. Stop Lens Thickness Air Gap | | Refractive Index | Abbe No. | Focal Length |
| | Object | | INFINITY | | | | |
| 80 | Ape. Stop | | -0.423 | | | | |
| 11 | First Lens | 2.289 | 0.578 | T1 | 1.545 | 55.987 | 7.228 |
| 12 | | 4.961 | 0.284 | G12 | | | |
| 21 | Second Lens | 1.774 | 0.237 | T2 | 1.642 | 22.409 | -26.118 |
| 22 | | 1.521 | 0.223 | G23 | | | |
| 31 | Third Lens | 10.322 | 1.072 | T3 | 1.545 | 55.987 | 3.149 |
| 32 | | -1.989 | 0.059 | G34 | | | |
| 41 | Fourth Lens | -1.669 | 0.256 | T4 | 1.642 | 22.409 | -5.136 |
| 42 | | -3.554 | 0.067 | G45 | | | |
| 51 | Fifth Lens | -2.570 | 0.299 | T5 | 1.545 | 55.987 | 12.735 |
| 52 | | -1.954 | 0.149 | G56 | | | |
| 61 | Sixth Lens | 2.104 | 0.364 | T6 | 1.642 | 22.409 | 12.830 |
| 62 | | 2.625 | 0.562 | G67 | | | |
| 71 | Seventh Lens | -6.988 | 0.623 | T7 | 1.545 | 55.987 | -4.306 |
| 72 | | 3.657 | 0.511 | G7F | | | |
| 90 | Filter | INFINITY | 0.210 | | 1.517 | 64.167 | |
| | | INFINITY | 0.197 | | | | |
| 91 | Image Plane | INFINITY | | | | | |

FIG. 28

| No. | 11 | 12 | 21 | 22 | 31 | 32 | 41 |
|---|---|---|---|---|---|---|---|
| K | 0.000000E+00 | 0.000000E+00 | 3.235660E-01 | -5.131010E-02 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | 7.426790E-03 | -5.090455E-02 | -1.929264E-01 | -1.162800E-01 | 2.654610E-02 | 2.842290E-02 | 4.371832E-02 |
| a6 | -1.041558E-02 | 2.999861E-02 | -4.370839E-02 | -1.202699E-01 | -1.856486E-04 | -8.107286E-02 | -1.969570E-02 |
| a8 | 1.965500E-02 | 3.365164E-03 | 1.538754E-02 | 1.361477E-01 | -2.190851E-02 | 6.756466E-02 | 3.877661E-02 |
| a10 | -1.353061E-02 | -1.845650E-02 | 3.934076E-02 | -6.347551E-02 | 2.851193E-03 | -2.429740E-02 | -5.673453E-03 |
| a12 | 6.377116E-03 | 1.386503E-02 | -3.100620E-02 | 1.194810E-02 | 8.756025E-04 | 2.788622E-03 | -4.333430E-03 |
| a14 | -1.598448E-03 | -2.560345E-03 | 4.586424E-03 | -4.019952E-03 | 1.215900E-03 | -5.681925E-04 | -1.260905E-04 |
| a16 | 3.010332E-04 | -5.574700E-04 | -1.002747E-03 | 1.395342E-03 | -2.121957E-04 | 3.972686E-04 | 1.002218E-03 |
| a18 | 0.000000E+00 | 0.000000E+00 | 0.000000E+00 | 0.000000E+00 | 0.000000E+00 | 0.000000E+00 | -2.076318E-04 |

| No. | 42 | 51 | 52 | 61 | 62 | 71 | 72 |
|---|---|---|---|---|---|---|---|
| K | 0.000000E+00 | 0.000000E+00 | 0.000000E+00 | -1.802346E+00 | -1.294072E+00 | 0.000000E+00 | 1.192956E-01 |
| a2 | 0.000000E+00 | 0.000000E+00 | 0.000000E+00 | 0.000000E+00 | 0.000000E+00 | 0.000000E+00 | 0.000000E+00 |
| a4 | -1.965383E-01 | -7.337419E-02 | 9.829051E-02 | -9.330842E-02 | -8.627265E-02 | -8.396662E-02 | -7.870924E-02 |
| a6 | 1.567761E-01 | 2.085643E-02 | -4.658622E-02 | 1.670287E-02 | -1.059370E-02 | 9.776736E-03 | 2.184859E-02 |
| a8 | -5.958283E-02 | -1.126178E-03 | 1.085805E-02 | -8.324325E-03 | 4.029653E-03 | 3.300666E-03 | -3.491817E-03 |
| a10 | 8.467749E-03 | 1.067773E-02 | 6.881645E-03 | 1.646468E-03 | -9.265598E-04 | 8.999501E-04 | 1.691895E-04 |
| a12 | 3.295878E-03 | -6.240992E-03 | -7.259656E-04 | 7.122818E-04 | 2.027631E-04 | -7.041670E-04 | 3.164582E-05 |
| a14 | -1.161528E-03 | 1.170860E-03 | -9.465906E-04 | -5.770556E-04 | 1.128327E-04 | 1.084503E-04 | -6.549243E-06 |
| a16 | -1.486462E-04 | 3.362671E-04 | 1.460523E-04 | 1.041194E-04 | -7.857002E-07 | -3.516393E-06 | 4.811748E-07 |
| a18 | 5.488557E-05 | -1.694435E-04 | 1.022352E-05 | -1.687333E-06 | 3.536490E-07 | -2.226775E-07 | -1.304575E-08 |

FIG. 29

| | | Sixth Example | | | | |
|---|---|---|---|---|---|---|
| | TTL=5.523mm; EFL=3.943mm; HFOV=40.359 Degrees; IMH=3.400mm; Fno=1.600 |||||||
| No. | | Radius | Ape. Stop Lens Thickness Air Gap | | Refractive Index | Abbe No. | Focal Length |
| | Object | | INFINITY | | | | |
| 80 | Ape. Stop | | -0.412 | | | | |
| 11 | First Lens | 2.103 | 0.548 | T1 | 1.545 | 55.987 | 7.065 |
| 12 | | 4.195 | 0.345 | G12 | | | |
| 21 | Second Lens | 2.010 | 0.203 | T2 | 1.642 | 22.409 | -23.119 |
| 22 | | 1.702 | 0.158 | G23 | | | |
| 31 | Third Lens | 12.060 | 0.660 | T3 | 1.545 | 55.987 | 3.910 |
| 32 | | -2.546 | 0.060 | G34 | | | |
| 41 | Fourth Lens | -1.845 | 0.395 | T4 | 1.642 | 22.409 | -3.878 |
| 42 | | -7.549 | 0.041 | G45 | | | |
| 51 | Fifth Lens | -4.158 | 0.335 | T5 | 1.545 | 55.987 | 6.058 |
| 52 | | -1.895 | 0.033 | G56 | | | |
| 61 | Sixth Lens | 2.539 | 0.597 | T6 | 1.642 | 22.409 | 10.801 |
| 62 | | 3.619 | 0.869 | G67 | | | |
| 71 | Seventh Lens | -8.735 | 0.364 | T7 | 1.545 | 55.987 | -5.189 |
| 72 | | 4.258 | 0.511 | G7F | | | |
| 90 | Filter | INFINITY | 0.210 | | 1.517 | 64.167 | |
| | | INFINITY | 0.197 | | | | |
| 91 | Image Plane | INFINITY | | | | | |

FIG. 30

| No. | 11 | 12 | 21 | 22 | 31 | 32 | 41 |
|---|---|---|---|---|---|---|---|
| K | 0.000000E+00 | 0.000000E+00 | 2.160171E-01 | -1.437787E-02 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | 3.850825E-03 | -3.492072E-02 | -1.918574E-01 | -1.223365E-01 | 2.629497E-02 | 2.730383E-02 | 6.678952E-02 |
| a6 | -3.939012E-03 | 1.691881E-02 | -5.146199E-02 | -1.132075E-01 | 2.455680E-03 | -7.914258E-02 | -2.276089E-02 |
| a8 | 1.567511E-02 | 3.888366E-03 | 1.011673E-02 | 1.389912E-01 | -2.187845E-02 | 6.790784E-02 | 3.830533E-02 |
| a10 | -1.469327E-02 | -1.708917E-02 | 4.218693E-02 | -6.400027E-02 | 2.562304E-03 | -2.413290E-02 | -5.494759E-03 |
| a12 | 7.615129E-03 | 1.400692E-02 | -2.779349E-02 | 1.111845E-02 | 6.605373E-04 | 2.989924E-03 | -4.240963E-03 |
| a14 | -9.460018E-04 | -2.909575E-03 | 5.149385E-03 | -4.400537E-03 | 1.129197E-03 | -4.542661E-04 | -1.998632E-04 |
| a16 | -2.844842E-04 | -1.123451E-03 | -2.410557E-03 | 1.364078E-03 | -2.319944E-04 | 4.154753E-04 | 8.713898E-04 |
| a18 | 0.000000E+00 | 0.000000E+00 | 0.000000E+00 | 0.000000E+00 | 0.000000E+00 | 0.000000E+00 | -3.263754E-04 |
| No. | 42 | 51 | 52 | 61 | 62 | 71 | 72 |
| K | 0.000000E+00 | 0.000000E+00 | 0.000000E+00 | -7.133959E-01 | 7.341185E-01 | 0.000000E+00 | 4.608598E-01 |
| a2 | 0.000000E+00 | 0.000000E+00 | 0.000000E+00 | 0.000000E+00 | 0.000000E+00 | 0.000000E+00 | 0.000000E+00 |
| a4 | -2.025733E-01 | -7.691920E-02 | 1.090946E-01 | -9.415214E-02 | -6.715873E-02 | -7.959306E-02 | -7.886138E-02 |
| a6 | 1.514667E-01 | 2.167355E-02 | -4.476144E-02 | 2.247585E-02 | 2.970375E-03 | 1.067080E-02 | 2.228052E-02 |
| a8 | -5.985574E-02 | -2.065211E-02 | 1.099991E-02 | -7.095857E-03 | 4.361088E-03 | 3.165521E-03 | -3.470761E-03 |
| a10 | 9.062707E-03 | 9.997589E-03 | 6.856899E-03 | 1.546412E-03 | -1.043092E-03 | 8.794725E-04 | 1.802293E-04 |
| a12 | 3.500725E-03 | -6.249211E-03 | -7.707499E-04 | 6.763200E-04 | -6.602675E-06 | -7.041101E-06 | 3.190626E-05 |
| a14 | -1.159551E-03 | 1.289466E-03 | -9.635004E-04 | -5.793671E-04 | 8.817648E-06 | 1.090662E-04 | -6.548704E-06 |
| a16 | -1.725864E-04 | 3.841408E-04 | 1.448999E-04 | 1.038869E-04 | -8.170268E-07 | -3.449074E-06 | 4.819743E-07 |
| a18 | 4.602787E-05 | -1.781820E-04 | 1.246505E-05 | -2.147251E-06 | 3.029233E-07 | -2.503893E-07 | -1.447899E-08 |

FIG. 31

| Seventh Example | | | | | | |
|---|---|---|---|---|---|---|
| TTL=5.285mm; EFL=3.891mm; HFOV=40.000 Degrees; IMH=3.372mm; Fno=1.800 | | | | | | |
| No. | | Radius | Ape. Stop Lens Thickness Air Gap | | Refractive Index | Abbe No. | Focal Length |
| | Object | | INFINITY | | | | |
| 11 | First Lens | 2.166 | 0.611 | T1 | 1.545 | 55.987 | 6.318 |
| 12 | | 5.235 | 0.251 | G12 | | | |
| 80 | Ape. Stop | | 0.164 | | | | |
| 21 | Second Lens | 1.866 | 0.217 | T2 | 1.642 | 22.409 | -25.389 |
| 22 | | 1.599 | 0.149 | G23 | | | |
| 31 | Third Lens | 9.109 | 0.692 | T3 | 1.545 | 55.987 | 3.649 |
| 32 | | -2.483 | 0.077 | G34 | | | |
| 41 | Fourth Lens | -1.799 | 0.379 | T4 | 1.642 | 22.409 | -3.928 |
| 42 | | -6.662 | 0.038 | G45 | | | |
| 51 | Fifth Lens | -5.226 | 0.358 | T5 | 1.545 | 55.987 | 5.237 |
| 52 | | -1.894 | 0.044 | G56 | | | |
| 61 | Sixth Lens | 2.103 | 0.381 | T6 | 1.642 | 22.409 | 14.217 |
| 62 | | 2.532 | 0.652 | G67 | | | |
| 71 | Seventh Lens | -4.007 | 0.335 | T7 | 1.545 | 55.987 | -3.874 |
| 72 | | 4.618 | 0.511 | G7F | | | |
| 90 | Filter | INFINITY | 0.210 | | 1.517 | 64.167 | |
| | | INFINITY | 0.217 | | | | |
| 91 | Image Plane | INFINITY | | | | | |

FIG. 32

| No. | 11 | 12 | 21 | 22 | 31 | 32 | 41 |
|---|---|---|---|---|---|---|---|
| K | 0.000000E+00 | 0.000000E+00 | 2.713746E-01 | -4.174912E-02 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | -2.186807E-03 | -3.697057E-02 | -1.902384E-01 | -1.232346E-01 | 2.303262E-02 | 2.635242E-02 | 6.133604E-02 |
| a6 | -3.766093E-03 | 1.426943E-02 | -4.771433E-02 | -1.173145E-01 | 3.362853E-03 | -8.030525E-02 | -2.194588E-02 |
| a8 | 1.437525E-02 | 4.304773E-03 | 8.964439E-03 | 1.369313E-01 | -2.032167E-02 | 6.745399E-02 | 3.883957E-02 |
| a10 | -1.597779E-02 | -1.711852E-02 | 4.106363E-02 | -6.526901E-02 | 3.815377E-03 | -2.427329E-02 | -5.289341E-03 |
| a12 | 7.077978E-03 | 1.313106E-02 | -2.869192E-02 | 1.048085E-02 | 1.232673E-03 | 3.047839E-03 | -4.225595E-03 |
| a14 | -7.825983E-04 | -3.565908E-03 | 3.707528E-03 | -4.612010E-03 | 1.253671E-03 | -2.675301E-04 | -2.549385E-04 |
| a16 | -1.734389E-04 | 1.198866E-04 | -4.817109E-03 | 1.354808E-03 | -2.708006E-04 | 6.292577E-04 | 8.051516E-04 |
| a18 | 0.000000E+00 | 0.000000E+00 | 0.000000E+00 | 0.000000E+00 | 0.000000E+00 | 0.000000E+00 | -3.807329E-04 |
| No. | 42 | 51 | 52 | 61 | 62 | 71 | 72 |
| K | 0.000000E+00 | 0.000000E+00 | 0.000000E+00 | -1.702297E+00 | -3.426743E-01 | 0.000000E+00 | 5.358506E-01 |
| a2 | 0.000000E+00 | 0.000000E+00 | 0.000000E+00 | 0.000000E+00 | 0.000000E+00 | 0.000000E+00 | 0.000000E+00 |
| a4 | -1.958907E-01 | -6.745145E-02 | 1.096771E-01 | -1.021670E-01 | -7.663386E-02 | -6.632511E-02 | -8.822658E-02 |
| a6 | 1.528347E-01 | 1.921616E-02 | -4.366743E-02 | 1.609601E-02 | -2.629054E-03 | 8.780456E-03 | 2.249248E-02 |
| a8 | -5.952484E-02 | -2.605959E-03 | 1.129674E-02 | -7.185386E-03 | 4.044632E-03 | 3.118750E-03 | -3.530263E-03 |
| a10 | 9.150216E-03 | 9.926537E-03 | 6.909744E-03 | 1.694151E-03 | -9.557845E-04 | 8.374027E-04 | 1.829501E-04 |
| a12 | 3.528214E-03 | -6.251868E-03 | -7.656128E-04 | 6.174856E-04 | 1.959951E-05 | -7.003312E-04 | 3.273432E-05 |
| a14 | -1.144695E-03 | 1.288970E-03 | -9.644454E-04 | -6.197283E-04 | 1.292853E-05 | 1.096917E-04 | -6.550762E-06 |
| a16 | -1.626924E-04 | 3.846809E-04 | 1.440272E-04 | 1.011915E-04 | -6.515424E-07 | -3.406599E-06 | 4.657966E-07 |
| a18 | 5.133710E-05 | -1.754197E-04 | 1.197422E-05 | 4.669997E-06 | 1.761053E-07 | -2.675694E-07 | -1.730524E-08 |

FIG. 33

| Example | 1st | 2nd | 3rd | 4th | 5th | 6th | 7th |
|---|---|---|---|---|---|---|---|
| T1 | 0.645 | 0.622 | 0.695 | 0.563 | 0.578 | 0.548 | 0.611 |
| G12 | 0.131 | 0.366 | 0.380 | 0.322 | 0.284 | 0.345 | 0.414 |
| T2 | 0.288 | 0.229 | 0.170 | 0.214 | 0.237 | 0.203 | 0.217 |
| G23 | 0.220 | 0.166 | 0.148 | 0.165 | 0.223 | 0.158 | 0.149 |
| T3 | 0.722 | 0.675 | 0.932 | 0.937 | 1.072 | 0.660 | 0.692 |
| G34 | 0.184 | 0.074 | 0.052 | 0.147 | 0.059 | 0.060 | 0.077 |
| T4 | 0.260 | 0.337 | 0.342 | 0.388 | 0.256 | 0.395 | 0.379 |
| G45 | 0.078 | 0.052 | 0.032 | 0.035 | 0.067 | 0.041 | 0.038 |
| T5 | 0.334 | 0.330 | 0.347 | 0.359 | 0.299 | 0.335 | 0.358 |
| G56 | 0.122 | 0.045 | 0.124 | 0.087 | 0.149 | 0.033 | 0.044 |
| T6 | 0.319 | 0.344 | 0.477 | 0.333 | 0.364 | 0.597 | 0.381 |
| G67 | 0.571 | 0.739 | 0.444 | 0.525 | 0.562 | 0.869 | 0.652 |
| T7 | 0.305 | 0.269 | 0.445 | 0.263 | 0.623 | 0.364 | 0.335 |
| G7F | 0.502 | 0.400 | 0.511 | 0.511 | 0.511 | 0.511 | 0.511 |
| TF | 0.210 | 0.210 | 0.210 | 0.210 | 0.210 | 0.210 | 0.210 |
| GFP | 0.197 | 0.208 | 0.188 | 0.265 | 0.197 | 0.197 | 0.217 |
| AAG | 1.306 | 1.443 | 1.181 | 1.281 | 1.344 | 1.505 | 1.375 |
| ALT | 2.874 | 2.806 | 3.408 | 3.056 | 3.428 | 3.101 | 2.973 |
| BFL | 0.909 | 0.818 | 0.909 | 0.986 | 0.918 | 0.917 | 0.937 |
| TTL | 5.089 | 5.066 | 5.497 | 5.322 | 5.690 | 5.523 | 5.285 |
| TL | 4.180 | 4.248 | 4.588 | 4.337 | 4.772 | 4.606 | 4.348 |
| EFL | 3.901 | 4.249 | 4.168 | 3.912 | 4.100 | 3.943 | 3.891 |

FIG. 34

| Example | 1st | 2nd | 3rd | 4th | 5th | 6th | 7th |
|---|---|---|---|---|---|---|---|
| AAG/G12 | 9.998 | 3.940 | 3.103 | 3.981 | 4.732 | 4.360 | 3.318 |
| (G23+G34+G45+G56)/T7 | 1.981 | 1.253 | 0.800 | 1.654 | 0.798 | 0.800 | 0.921 |
| EFL/BFL | 4.290 | 5.196 | 4.587 | 3.969 | 4.468 | 4.300 | 4.152 |
| (T1+T6)/(T4+T5) | 1.623 | 1.448 | 1.700 | 1.200 | 1.700 | 1.569 | 1.346 |
| T3/T2 | 2.504 | 2.940 | 5.497 | 4.389 | 4.525 | 3.255 | 3.185 |
| ALT/T3 | 3.983 | 4.159 | 3.656 | 3.260 | 3.199 | 4.699 | 4.295 |
| T4/G12 | 1.991 | 0.921 | 0.899 | 1.204 | 0.900 | 1.144 | 0.915 |
| TL/(T5+T6) | 6.393 | 6.310 | 5.567 | 6.272 | 7.200 | 4.944 | 5.888 |
| AAG/BFL | 1.436 | 1.764 | 1.299 | 1.300 | 1.464 | 1.642 | 1.467 |
| (T2+G67)/(T1+G12) | 1.108 | 0.980 | 0.571 | 0.834 | 0.927 | 1.201 | 0.848 |
| TTL/BFL | 5.596 | 6.195 | 6.050 | 5.400 | 6.200 | 6.023 | 5.640 |
| (T3+G34+T4+G45+T5)/(T6+G67+T7) | 1.320 | 1.086 | 1.248 | 1.666 | 1.130 | 0.814 | 1.129 |
| (T2+T6)/T7 | 1.993 | 2.127 | 1.452 | 2.079 | 0.964 | 2.200 | 1.788 |
| EFL/T1 | 6.045 | 6.833 | 6.000 | 6.946 | 7.093 | 7.200 | 6.369 |
| G67/T4 | 2.197 | 2.190 | 1.299 | 1.354 | 2.200 | 2.200 | 1.720 |
| AAG/T5 | 3.904 | 4.375 | 3.400 | 3.570 | 4.500 | 4.500 | 3.846 |
| (G23+G34+G45+G56)/T2 | 2.095 | 1.471 | 2.100 | 2.035 | 2.100 | 1.434 | 1.418 |
| TL/(T3+T7) | 4.072 | 4.500 | 3.331 | 3.615 | 2.815 | 4.500 | 4.234 |
| TTL/(T1+G12) | 6.558 | 5.128 | 5.113 | 6.014 | 6.600 | 6.185 | 5.154 |
| ALT/(T6+G67) | 3.226 | 2.593 | 3.700 | 3.563 | 3.701 | 2.114 | 2.877 |

FIG. 35

OPTICAL IMAGING LENS

BACKGROUND OF THE INVENTION

1. Field of the Invention

The present invention generally relates to an optical imaging lens. Specifically speaking, the present invention is directed to an optical imaging lens for use in portable electronic devices such as mobile phones, cameras, tablet personal computers or personal digital assistants (PDA), for taking pictures and for recording videos, or for video-recording devices in vehicles.

2. Description of the Prior Art

The specifications of portable electronic devices change all the time and the key element—optical imaging lens—develops concurrently so a good imaging quality is needed as well as a smaller size. More important features of optical imaging lens are not only the imaging quality and the size, the demands for enhancing the viewing angle and for enlarging the aperture stop are also more and more important. With the improvement of the image sensing technology, as far as the imaging quality is concerned, the consumers have higher and higher demands for better imaging quality. In the field of optical imagining lens design, in addition to the pursuit of thinner lens elements, the lens imaging quality and performance must also be taken into account.

However, in order to produce the optical imaging lens with good imaging quality and small size, it is not as simple as just scaling down the size of the optical imaging lens with good imaging quality. The designs not only involve the material properties, but also the production, the assembly yield and other practical issues which should also be taken into consideration as well.

Accordingly, it is more difficult to diminish a mini-lens than to diminish a conventional one. Therefore, how to make optical imaging lens that meet the requirements of consumer electronic products and continuously improve the imaging quality, is an important objective to research.

SUMMARY OF THE INVENTION

In light of the above, the present invention proposes an optical imaging lens of seven lens elements. The optical imaging lens has reduced total length, ensured imaging quality, an enhanced viewing angle, an enlarged aperture stop, good optical performance and is technically possible. The optical imaging lens of seven lens elements of the present invention from an object side to an image side in order along an optical axis has a first lens element, a second lens element, a third lens element, a fourth lens element, a fifth lens element, a sixth lens element and a seventh lens element. Each one of the first lens element, the second lens element, the third lens element, the fourth lens element, the fifth lens element, the sixth lens element and the seventh lens element respectively has an object-side surface which faces toward the object side to allow imaging rays to pass through as well as an image-side surface which faces toward the image side to allow the imaging rays to pass through.

In one embodiment of the present invention, the optical-axis region of the object-side surface of the fourth lens element is concave, the periphery region of the image-side surface of the fifth lens element is concave and the optical-axis region of the image-side surface of the sixth lens element is concave. AAG is a sum of total six air gaps from the first lens element to the seventh lens element and G12 is an air gap between the first lens element and the second lens element to satisfy AAG/G12≤10.000.

In the optical imaging lens of the present invention, the embodiments further satisfy the following relationships:

| | |
|---|---|
| $(G23+G34+G45+G56)/T7 \leq 2.000$. | 1. |
| $EFL/BFL \leq 5.200$. | 2. |
| $(T1+T6)/(T4+T5) \leq 1.700$. | 3. |
| $T3/T2 \leq 5.500$. | 4. |
| $ALT/T3 \leq 4.700$. | 5. |
| $T4/G12 \leq 2.000$. | 6. |
| $TL/(T5+T6) \leq 7.500$. | 7. |
| $AAG/BFL \leq 1.800$. | 8. |
| $(T2+G67)/(T1+G12) \leq 1.300$. | 9. |
| $TTL/BFL \leq 6.200$. | 10. |
| $(T3+G34+T4+G45+T5)/(T6+G67+T7) \leq 1.700$. | 11. |
| $(T2+T6)/T7 \leq 2.200$. | 12. |
| $EFL/T1 \leq 7.200$. | 13. |
| $G67/T4 \leq 2.200$. | 14. |
| $AAG/T5 \leq 4.500$. | 15. |
| $(G23+G34+G45+G56)/T2 \leq 2.100$. | 16. |
| $TL/(T3+T7) \leq 4.500$. | 17. |
| $TTL/(T1+G12) \leq 6.600$. | 18. |
| $ALT/(T6+G67) \leq 3.800$. | 19. |

T1 is a thickness of the first lens element along the optical axis, T2 is a thickness of the second lens element along the optical axis, T3 is a thickness of the third lens element along the optical axis, T4 is a thickness of the fourth lens element along the optical axis, T5 is a thickness of the fifth lens element along the optical axis, T6 is a thickness of the sixth lens element along the optical axis and T7 is a thickness of the seventh lens element along the optical axis. An air gap G12 is disposed between the first lens element and the second lens element. An air gap G23 is disposed between the second lens element and the third lens element along the optical axis. An air gap G34 is disposed between the third lens element and the fourth lens element along the optical axis. An air gap G45 is disposed between the fourth lens element and the fifth lens element along the optical axis. An air gap G56 is disposed between the fifth lens element and the sixth lens element along the optical axis and an air gap G67 is disposed between the sixth lens element and the seventh lens element along the optical axis. The distance from the object-side surface of the first lens element to the image plane, namely the total length of the optical imaging lens along the optical axis is TTL. The effective focal length of the optical imaging lens is EFL. The distance from the object-side surface of the first lens element to the image-side surface of the seventh lens element along the optical axis is TL. The distance from the image-side surface of the seventh lens element to the filter along the optical axis is G7F. The thickness of the filter along the optical axis is TF. The distance from the filter to the image plane along the optical axis is GFP. The distance from the image-side surface of the seventh lens element to the image plane along the optical axis is BFL.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its periphery of one lens element.

FIG. 20 shows the optical data of the first example of the optical imaging lens.

FIG. 21 shows the aspheric surface data of the first example.

FIG. 22 shows the optical data of the second example of the optical imaging lens.

FIG. 23 shows the aspheric surface data of the second example.

FIG. 24 shows the optical data of the third example of the optical imaging lens.

FIG. 25 shows the aspheric surface data of the third example.

FIG. 26 shows the optical data of the fourth example of the optical imaging lens.

FIG. 27 shows the aspheric surface data of the fourth example.

FIG. 28 shows the optical data of the fifth example of the optical imaging lens.

FIG. 29 shows the aspheric surface data of the fifth example.

FIG. 30 shows the optical data of the sixth example of the optical imaging lens.

FIG. 31 shows the aspheric surface data of the sixth example.

FIG. 32 shows the optical data of the seventh example of the optical imaging lens.

FIG. 33 shows the aspheric surface data of the seventh example.

FIG. 34 shows some important ratios in the examples.

FIG. 35 shows some important ratios in the examples.

DETAILED DESCRIPTION

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figures 3, 4, 5:
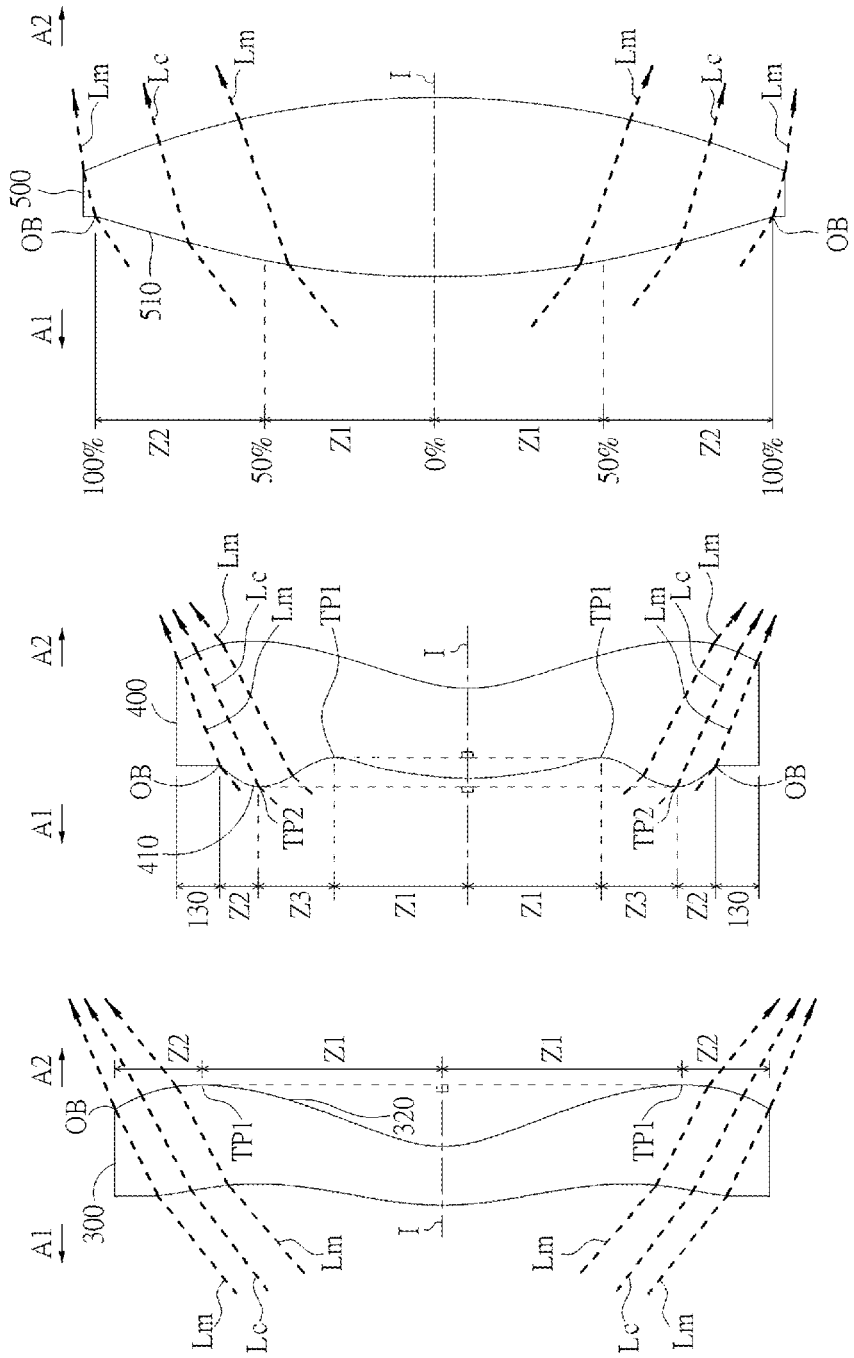

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the $N^{th}$ transition point (farthest from the optical axis I).

The region of a surface of the lens element from the central point to the first transition point TP1 is defined as the optical axis region, which includes the central point. The region located radially outside of the farthest $N^{th}$ transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
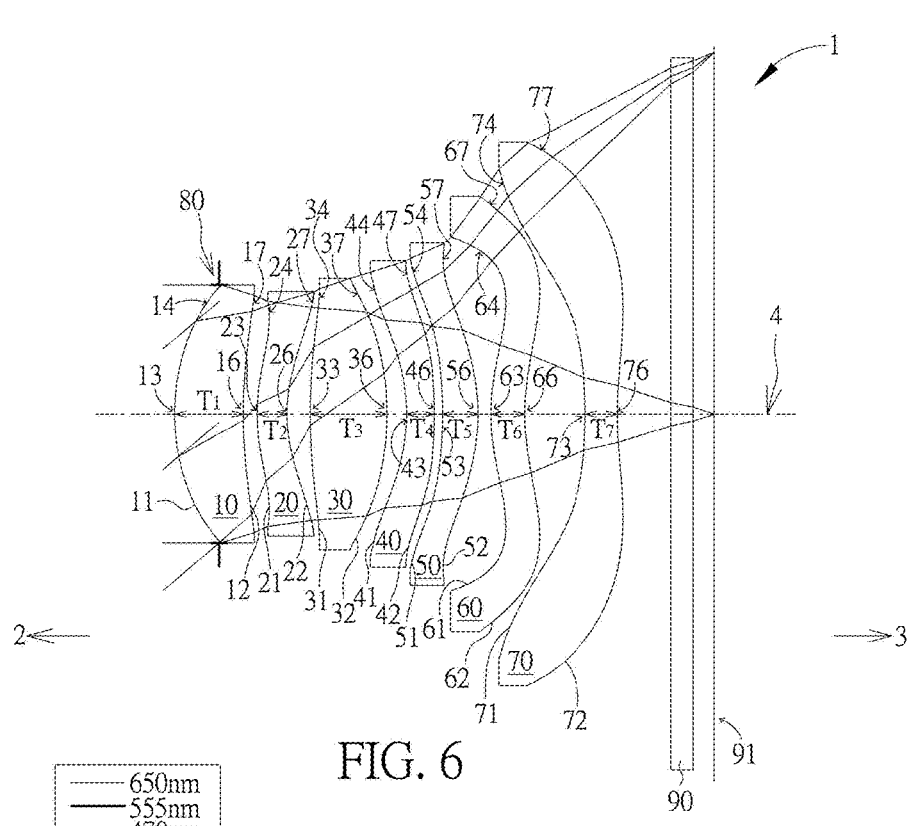
FIG. 6 illustrates a first example of the optical imaging lens of the present invention.

As shown in FIG. 6, the optical imaging lens 1 of seven lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a seventh lens element 70, a filter 90 and an image plane 91. Generally speaking, the first lens element 10, the second lens element 20, the third lens element 30, the fourth lens element 40, the fifth lens element 50, the sixth lens element 60 and the seventh lens element 70 may be made of a transparent plastic material but the present invention is not limited to this, and each lens element has an appropriate refracting power. In the optical imaging lens 1 of the present invention, lens elements having refracting power included by the optical imaging lens 1 are only the seven lens elements described above. The optical axis 4 is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 to be disposed in an appropriate position. In FIG. 6, the aperture stop 80 is disposed between the object side 2 and the first lens element 10. When light emitted or reflected by an object (not shown) which is located at the object side 2 enters the optical imaging lens 1 of the present invention, it forms a clear and sharp image on the image plane 91 at the image side 3 after passing through the aperture stop 80, the first lens element 10, the second lens element 20, the third lens element 30, the fourth lens element 40, the fifth lens element 50, the sixth lens element 60, the seventh lens element 70 and the filter 90. In each embodiment of the present invention, the filter 90 is placed between the image-side surface 72 of the seventh lens element 70 and the image plane 91, and may be a filter of various suitable functions, for example, the filter 90 may be an infrared cut filter (IR cut filter) or a visible light cut filter.

Each lens element in the optical imaging lens 1 of the present invention has an object-side surface facing toward the object side 2 to allow imaging rays to pass through as well as an image-side surface facing toward the image side 3 to allow imaging rays to pass through. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; and the seventh lens element 70 has an object-side surface 71 and an image-side surface 72. In addition, each object-side surface and image-side surface in the optical imaging lens 1 of the present invention has an optical axis region and a periphery region.

Each lens element in the optical imaging lens 1 of the present invention further has a thickness T along the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7. Therefore, a sum of the thickness of all the seven lens elements in the optical imaging lens 1 along the optical axis 4 is ALT=T1+T2+T3+T4+T5+T6+T7.

In addition, between two adjacent lens elements in the optical imaging lens 1 of the present invention there is an air gap along the optical axis 4. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60 as well as an air gap G67 disposed between the sixth lens element 60 and the seventh lens element 70. Therefore, a sum of six air gaps from the first lens element 10 to the seventh lens element 70 along the optical axis 4 is AAG=G12+G23+G34+G45+G56+G67.

In addition, the distance from the object-side surface 11 of the first lens element 10 to the image plane 91, namely the total length of the optical imaging lens along the optical axis 4 is TTL; an effective focal length of the optical imaging lens is EFL; the distance from the object-side surface 11 of the first lens element 10 to the image-side surface 72 of the seventh lens element 70 along the optical axis 4 is TL; the distance from the image-side surface 72 of the seventh lens element 70 to the filter 90 along the optical axis 4 is G7F;

the thickness of the filter 90 along the optical axis 4 is TF; the distance from the filter 90 to the image plane 91 along the optical axis 4 is GFP; and the distance from the image-side surface 72 of the seventh lens element 70 to the image plane 91 along the optical axis 4 is BFL. Therefore, BFL=G7F+TF+GFP.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the focal length of the seventh lens element 70 is f7; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the refractive index of the seventh lens element 70 is n7; the Abbe number of the first lens element 10 is ν1; the Abbe number of the second lens element 20 is ν2; the Abbe number of the third lens element 30 is ν3; and the Abbe number of the fourth lens element 40 is ν4; the Abbe number of the fifth lens element 50 is ν5; the Abbe number of the sixth lens element 60 is ν6; and the Abbe number of the seventh lens element 70 is ν7.

First Example

Figure 7A:
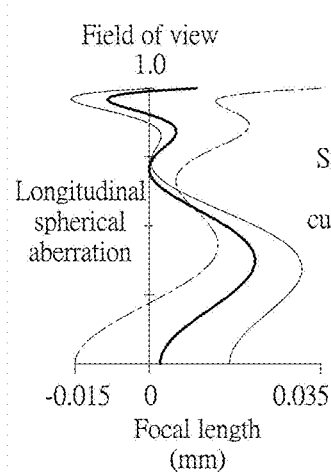
FIG. 7A illustrates the longitudinal spherical aberration on the image plane of the first example.
Figure 7B:
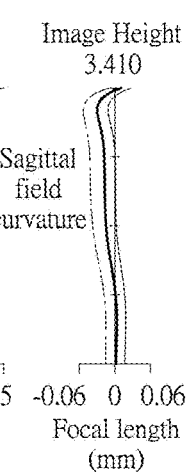
FIG. 7B illustrates the field curvature on the sagittal direction of the first example.
Figure 7C:
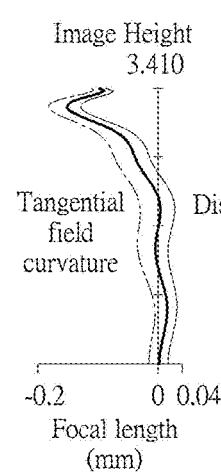
FIG. 7C illustrates the field curvature on the tangential direction of the first example.
Figure 7D:
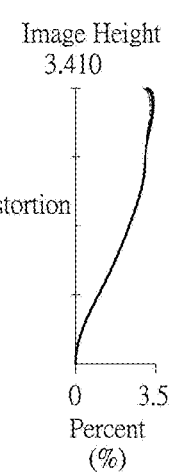
FIG. 7D illustrates the distortion of the first example.

Please refer to FIG. 6 which illustrates the first example of the optical imaging lens 1 of the present invention. Please refer to FIG. 7A for the longitudinal spherical aberration on the image plane 91 of the first example; please refer to FIG. 7B for the field curvature on the sagittal direction; please refer to FIG. 7C for the field curvature on the tangential direction; and please refer to FIG. 7D for the distortion. The Y axis of the spherical aberration in each example is "field of view" for 1.0. The Y axis of the field curvature and the distortion in each example stands for "image height", IMH, which is 3.410 mm.

The optical imaging lens 1 of the first example exclusively has seven lens elements 10, 20, 30, 40, 50, 60 and 70 with refracting power. The optical imaging lens 1 also has an aperture stop 80, a filter 90, and an image plane 91. The aperture stop 80 is provided between the object side 2 and the first lens element 10. The filter 90 may be used for preventing light of specific wavelength (such as the infrared light) reaching the image plane 91 to adversely affect the imaging quality.

The first lens element 10 has positive refracting power. An optical axis region 13 of the object-side surface 11 facing toward the object side 2 is convex, and a periphery region 14 of the object-side surface 11 facing toward the object side 2 is convex. An optical axis region 16 of the image-side surface 12 facing toward the image side 3 is concave, and a periphery region 17 of the image-side surface 12 facing toward the image side 3 is concave. Besides, both the object-side surface 11 and the image-side 12 of the first lens element 10 are aspherical surfaces.

The second lens element 20 has negative refracting power. An optical axis region 23 of the object-side surface 21 facing toward the object side 2 is convex, and a periphery region 24 of the object-side surface 21 facing toward the object side 2 is concave. An optical axis region 26 of the image-side surface 22 facing toward the image side 3 is concave, and a periphery region 27 of the image-side surface 22 facing toward the image side 3 is concave. Besides, both the object-side surface 21 and the image-side 22 of the second lens element 20 are aspherical surfaces.

The third lens element 30 has positive refracting power. An optical axis region 33 of the object-side surface 31 facing toward the object side 2 is convex, and a periphery region 34 of the object-side surface 31 facing toward the object side 2 is convex. An optical axis region 36 of the image-side surface 32 facing toward the image side 3 is convex, and a periphery region 37 of the image-side surface 32 facing toward the image side 3 is convex. Besides, both the object-side surface 31 and the image-side 32 of the third lens element 30 are aspherical surfaces.

The fourth lens element 40 has negative refracting power. An optical axis region 43 of the object-side surface 41 facing toward the object side 2 is concave, and a periphery region 44 of the object-side surface 41 facing toward the object side 2 is concave. An optical axis region 46 of the image-side surface 42 facing toward the image side 3 is convex, and a periphery region 47 of the image-side surface 42 facing toward the image side 3 is convex. Besides, both the object-side surface 41 and the image-side 42 of the fourth lens element 40 are aspherical surfaces.

The fifth lens element 50 has positive refracting power. An optical axis region 53 of the object-side surface 51 facing toward the object side 2 is concave, and a periphery region 54 of the object-side surface 51 facing toward the object side 2 is concave. An optical axis region 56 of the image-side surface 52 facing toward the image side 3 is convex, and a periphery region 57 of the image-side surface 52 facing toward the image side 3 is concave. Besides, both the object-side surface 51 and the image-side 52 of the fifth lens element 50 are aspherical surfaces.

The sixth lens element 60 has positive refracting power. An optical axis region 63 of the object-side surface 61 facing toward the object side 2 is convex, and a periphery region 64 of the object-side surface 61 facing toward the object side 2 is concave. An optical axis region 66 of the image-side surface 62 facing toward the image side 3 is concave, and a periphery region 67 of the image-side surface 62 facing toward the image side 3 is convex. Besides, both the object-side surface 61 and the image-side 62 of the sixth lens element 60 are aspherical surfaces.

The seventh lens element 70 has negative refracting power. An optical axis region 73 of the object-side surface 71 facing toward the object side 2 is concave, and a periphery region 74 of the object-side surface 71 facing toward the object side 2 is concave. An optical axis region 76 of the image-side surface 72 facing toward the image side 3 is concave, and a periphery region 77 of the image-side surface 72 facing toward the image side 3 is convex. Besides, both the object-side surface 71 and the image-side 72 of the seventh lens element 70 are aspherical surfaces.

In the first lens element 10, the second lens element 20, the third lens element 30, the fourth lens element 40, the fifth lens element 50, the sixth lens element 60 and the seventh lens element 70 of the optical imaging lens element 1 of the present invention, there are 14 surfaces, such as the object-side surfaces 11/21/31/41/51/61/71 and the image-side surfaces 12/22/32/42/52/62/72. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and $a_i$ is the aspheric coefficient of the $i^{th}$ order.

The optical data of the first example of the optical imaging lens 1 are shown in FIG. 20 while the aspheric surface data are shown in FIG. 21. In the present examples of the optical imaging lens, the f-number of the entire optical imaging lens element system is Fno, EFL is the effective focal length, HFOV stands for the half field of view which is half of the field of view of the entire optical imaging lens element system, and the unit for the curvature radius, the thickness and the focal length is in millimeters (mm). In this example, image height=3.410 mm; EFL=3.901 mm; HFOV=40.360 degrees; TTL=5.089 mm; Fno=1.600.

Second Example

Figure 8:
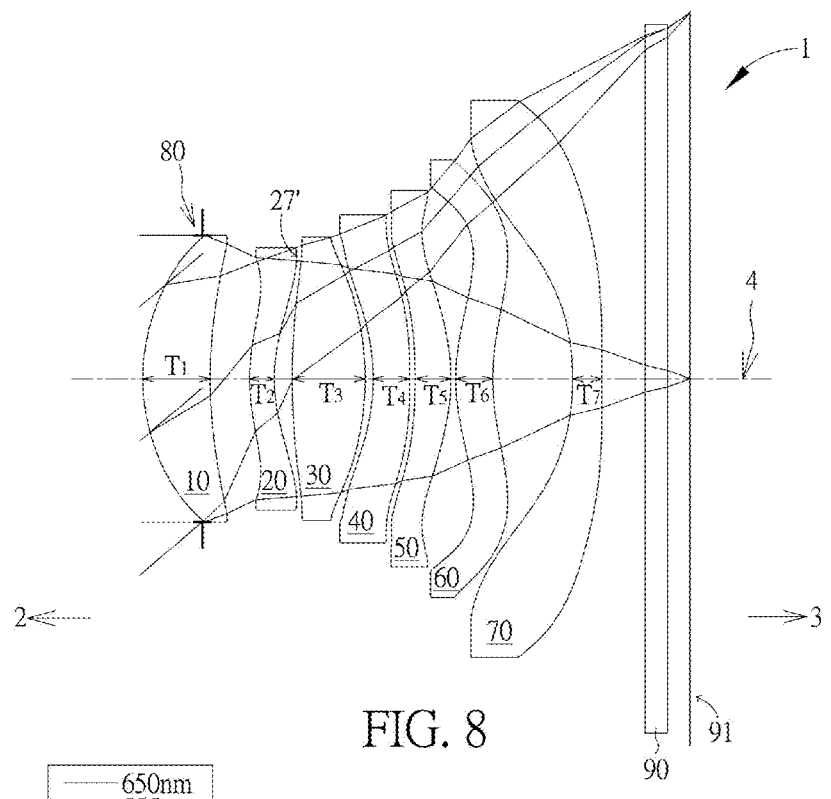
FIG. 8 illustrates a second example of the optical imaging lens of the present invention.
Figures 9A, 9B, 9C, 9D:
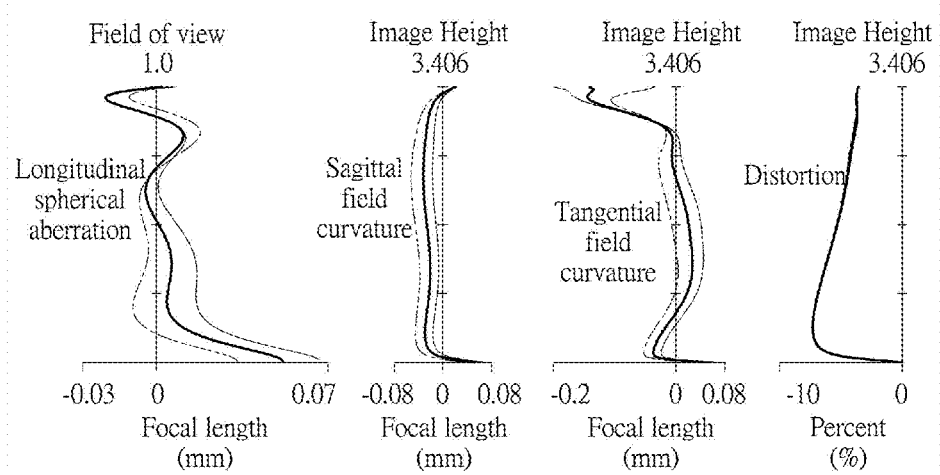
FIG. 9A illustrates the longitudinal spherical aberration on the image plane of the second example.
FIG. 9B illustrates the field curvature on the sagittal direction of the second example.
FIG. 9C illustrates the field curvature on the tangential direction of the second example.
FIG. 9D illustrates the distortion of the second example.

Please refer to FIG. 8 which illustrates the second example of the optical imaging lens 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the portion in a vicinity of the optical axis and the portion in a vicinity of its periphery will be omitted in the following examples. Please refer to FIG. 9A for the longitudinal spherical aberration on the image plane 91 of the second example, please refer to FIG. 9B for the field curvature on the sagittal direction, please refer to FIG. 9C for the field curvature on the tangential direction, and please refer to FIG. 9D for the distortion. The components in this example are similar to those in the first example, but the optical data such as the curvature radius, the lens thickness, the aspheric surface or the back focal length in this example are different from the optical data in the first example. Besides, in this example, the periphery region 27' of the image-side surface 22 of the second lens element 20 facing toward the image side 3 is convex.

The optical data of the second example of the optical imaging lens are shown in FIG. 22 while the aspheric surface data are shown in FIG. 23. In this example, image height=3.406 mm; EFL=4.249 mm; HFOV=40.360 degrees; TTL=5.066 mm; Fno=1.600. In particular, 1. TTL of the optical imaging lens in this example is shorter than that of the optical imaging lens in the first example, and 2. the fabrication of this example is easier than that of the first example so the yield is better.

Third Example

Figure 10:
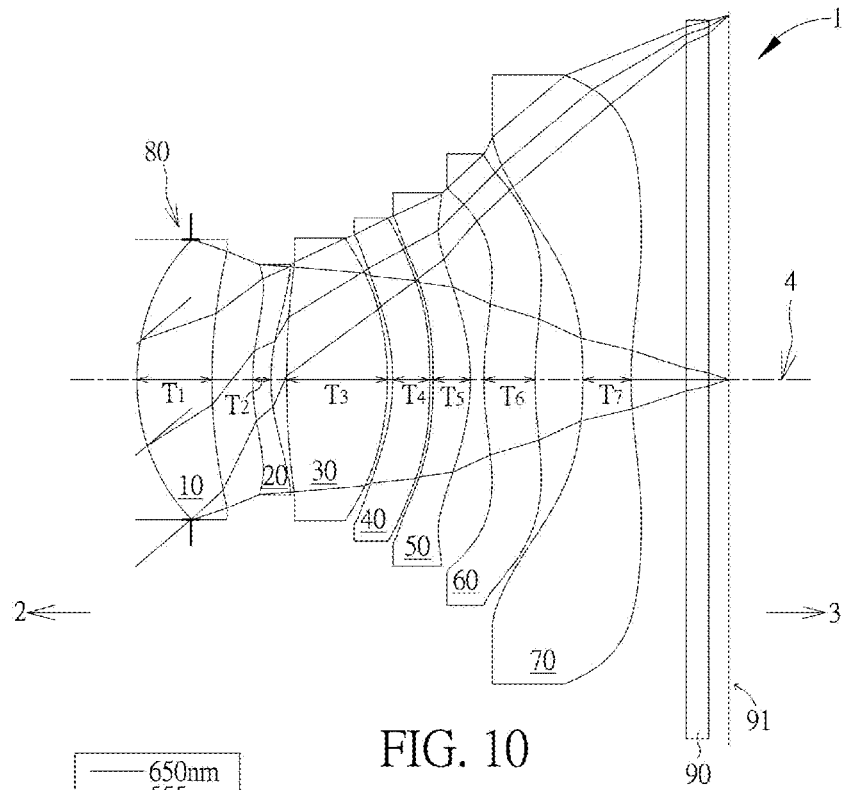
FIG. 10 illustrates a third example of the optical imaging lens of the present invention.
Figure 11A:
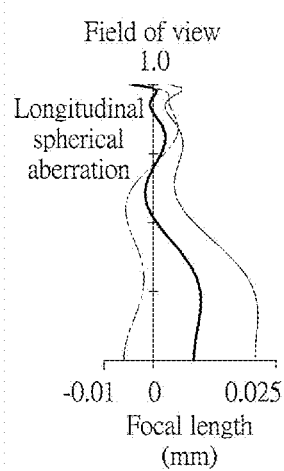
FIG. 11A illustrates the longitudinal spherical aberration on the image plane of the third example.
Figure 11B:
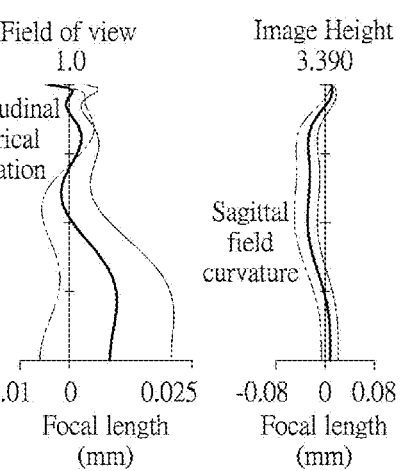
FIG. 11B illustrates the field curvature on the sagittal direction of the third example.
Figure 11C:
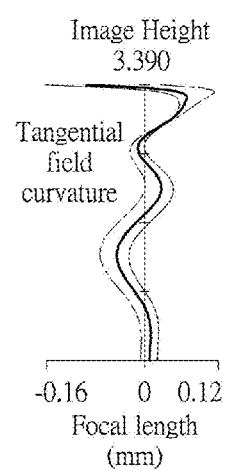
FIG. 11C illustrates the field curvature on the tangential direction of the third example.
Figure 11D:
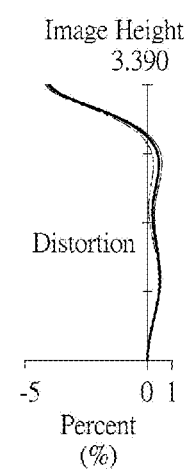
FIG. 11D illustrates the distortion of the third example.

Please refer to FIG. 10 which illustrates the third example of the optical imaging lens 1 of the present invention. Please refer to FIG. 11A for the longitudinal spherical aberration on the image plane 91 of the third example; please refer to FIG. 11B for the field curvature on the sagittal direction; please refer to FIG. 11C for the field curvature on the tangential direction; and please refer to FIG. 11D for the distortion. The components in this example are similar to those in the first example, but the optical data such as the curvature radius, the lens thickness, the aspheric surface or the back focal length in this example are different from the optical data in the first example.

The optical data of the third example of the optical imaging lens are shown in FIG. 24 while the aspheric surface data are shown in FIG. 25. In this example, image height=3.390 mm; EFL=4.168 mm; HFOV=40.363 degrees; TTL=5.497 mm; Fno=1.600. In particular, 1. the longitudinal spherical aberration of the optical imaging lens in this example is better than that of the optical imaging lens in the first example, 2. the HFOV of the optical imaging lens in this example is larger than that of the optical imaging lens in the first example, and 3. the fabrication of this example is easier than that of the first example so the yield is better.

Fourth Example

Figure 12:
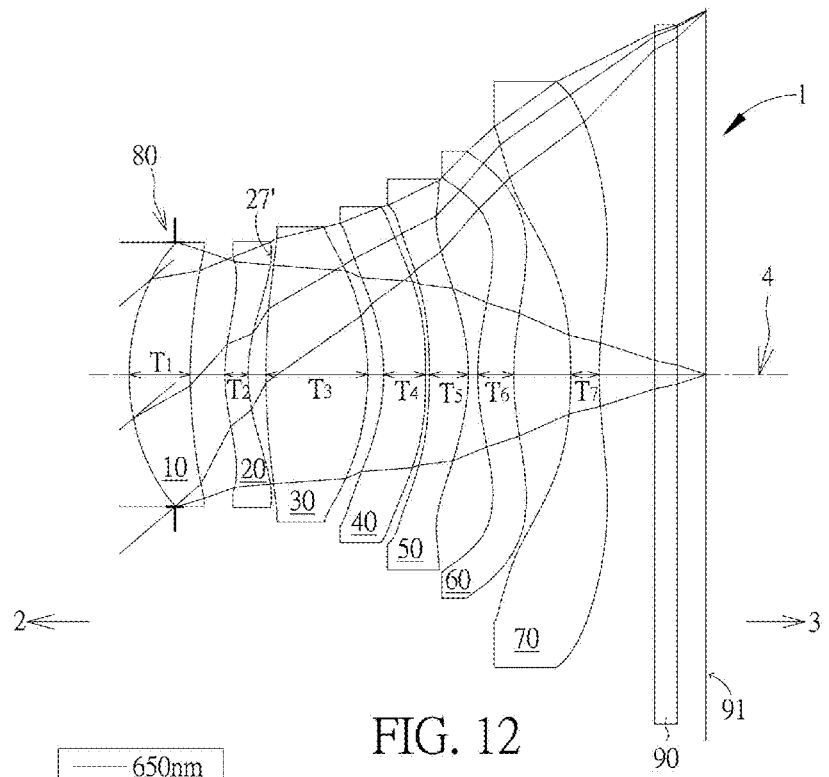
FIG. 12 illustrates a fourth example of the optical imaging lens of the present invention.
Figures 13A, 13B, 13C, 13D:
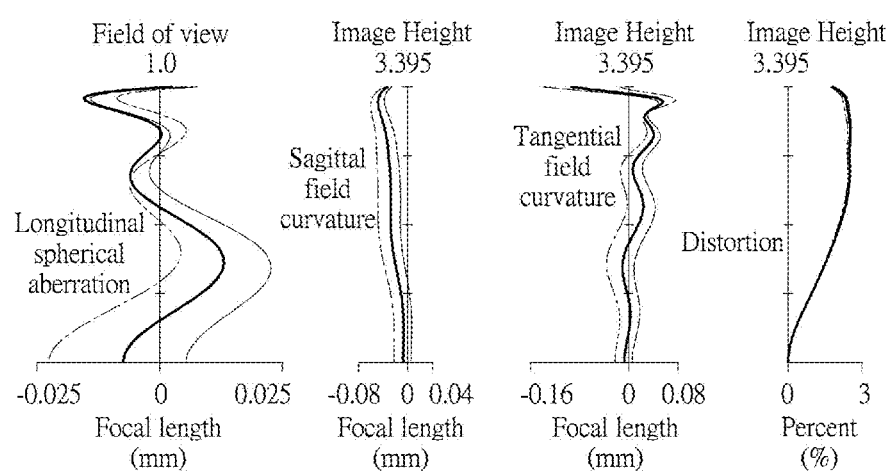
FIG. 13A illustrates the longitudinal spherical aberration on the image plane of the fourth example.
FIG. 13B illustrates the field curvature on the sagittal direction of the fourth example.
FIG. 13C illustrates the field curvature on the tangential direction of the fourth example.
FIG. 13D illustrates the distortion of the fourth example.

Please refer to FIG. 12 which illustrates the fourth example of the optical imaging lens 1 of the present invention. Please refer to FIG. 13A for the longitudinal spherical aberration on the image plane 91 of the fourth example; please refer to FIG. 13B for the field curvature on the sagittal direction; please refer to FIG. 13C for the field curvature on the tangential direction; and please refer to FIG. 13D for the distortion. The components in this example are similar to those in the first example, but the optical data such as the curvature radius, the lens thickness, the aspheric surface or the back focal length in this example are different from the optical data in the first example. Besides, in this example, the periphery region 27' of the image-side surface 22 of the second lens element 20 facing toward the image side 3 is convex.

The optical data of the fourth example of the optical imaging lens are shown in FIG. 26 while the aspheric surface data are shown in FIG. 27. In this example, image height=3.395 mm; EFL=3.912 mm; HFOV=40.360 degrees; TTL=5.322 mm; Fno=1.600. In particular, 1. the distortion aberration of the optical imaging lens in this example is better than that of the optical imaging lens in the first example, and 2. the fabrication of this example is easier than that of the first example so the yield is better.

Fifth Example

Figure 14:
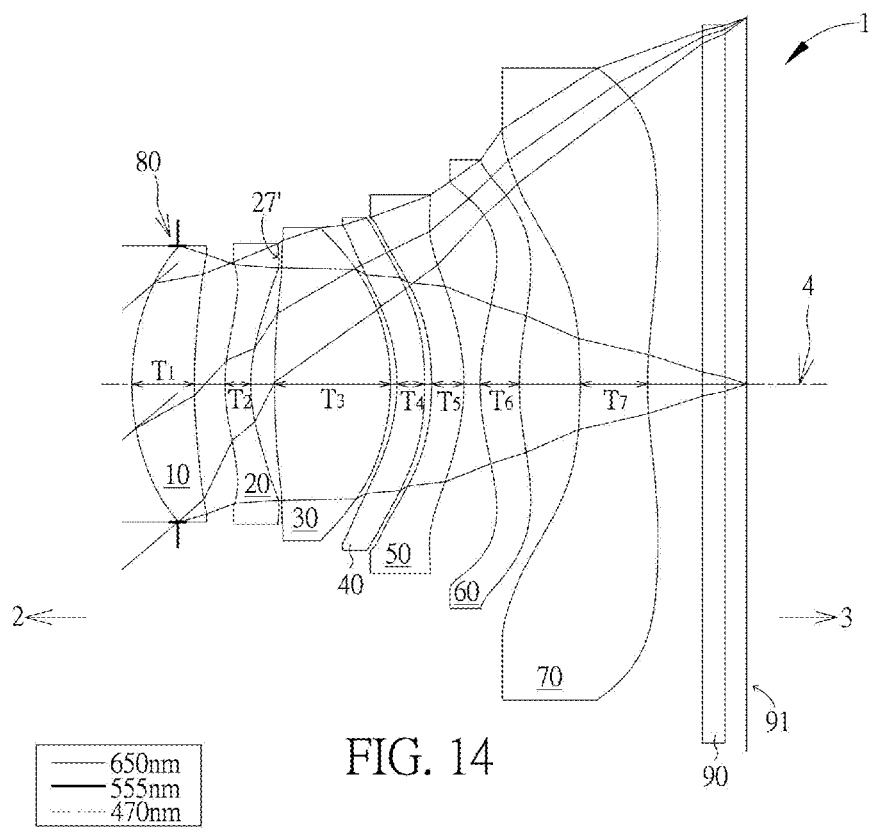
FIG. 14 illustrates a fifth example of the optical imaging lens of the present invention.
Figures 15A, 15B, 15C, 15D:
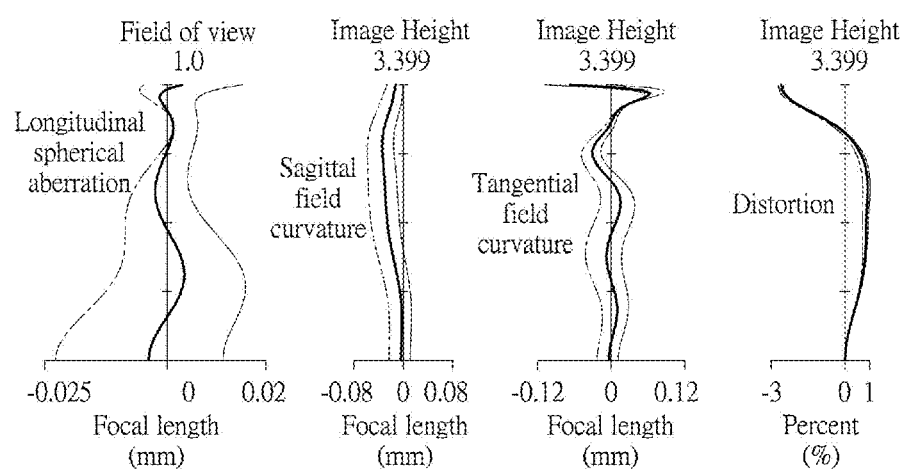
FIG. 15A illustrates the longitudinal spherical aberration on the image plane of the fifth example.
FIG. 15B illustrates the field curvature on the sagittal direction of the fifth example.
FIG. 15C illustrates the field curvature on the tangential direction of the fifth example.
FIG. 15D illustrates the distortion of the fifth example.

Please refer to FIG. 14 which illustrates the fifth example of the optical imaging lens 1 of the present invention. Please refer to FIG. 15A for the longitudinal spherical aberration on the image plane 91 of the fifth example; please refer to FIG. 15B for the field curvature on the sagittal direction; please refer to FIG. 15C for the field curvature on the tangential direction, and please refer to FIG. 15D for the distortion. The components in this example are similar to those in the first example, but the optical data such as the curvature radius, the lens thickness, the aspheric surface or the back focal length in this example are different from the optical data in the first example. Besides, in this example, the periphery region 27' of the image-side surface 22 of the second lens element 20 facing toward the image side 3 is convex.

The optical data of the fifth example of the optical imaging lens are shown in FIG. 28 while the aspheric surface data are shown in FIG. 29. In this example, image height=3.399 mm; EFL=4.100 mm; HFOV=40.360 degrees; TTL=5.690 mm; Fno=1.600. In particular, the fabrication of this example is easier than that of the first example so the yield is better.

Sixth Example

Figure 16:
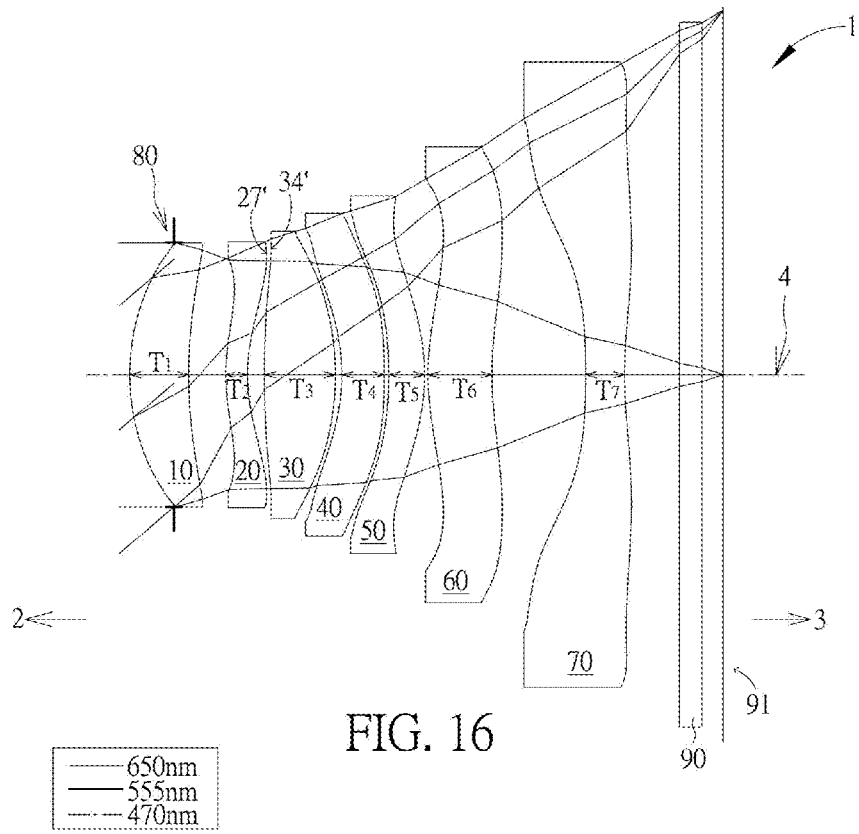
FIG. 16 illustrates a sixth example of the optical imaging lens of the present invention.
Figures 17A, 17B, 17C, 17D:
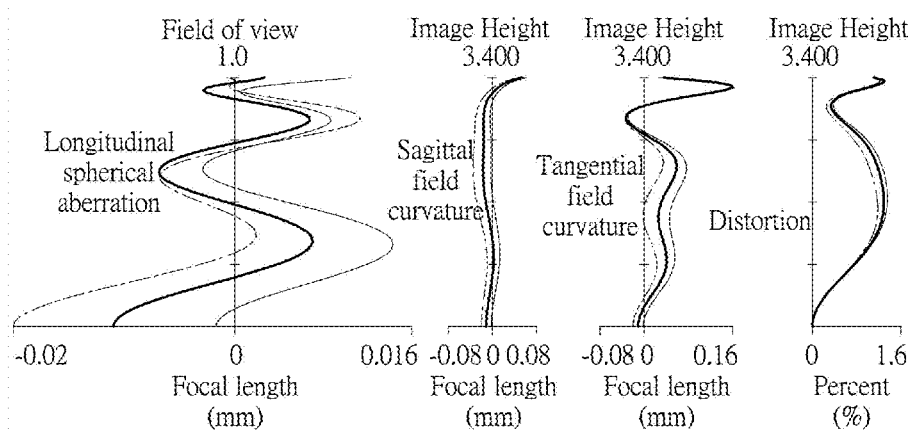
FIG. 17A illustrates the longitudinal spherical aberration on the image plane of the sixth example.
FIG. 17B illustrates the field curvature on the sagittal direction of the sixth example.
FIG. 17C illustrates the field curvature on the tangential direction of the sixth example.
FIG. 17D illustrates the distortion of the sixth example.

Please refer to FIG. 16 which illustrates the sixth example of the optical imaging lens 1 of the present invention. Please refer to FIG. 17A for the longitudinal spherical aberration on the image plane 91 of the sixth example; please refer to FIG. 17B for the field curvature on the sagittal direction; please refer to FIG. 17C for the field curvature on the tangential direction, and please refer to FIG. 17D for the distortion. The components in this example are similar to those in the first example, but the optical data such as the curvature radius, the lens thickness, the aspheric surface or the back focal length in this example are different from the optical data in the first example. Besides, in this example, the periphery region 27' of the image-side surface 22 of the second lens element 20 facing toward the image side 3 is convex and the periphery region 34' of the object-side surface 31 of the third lens element 30 facing toward the object side 2 is concave.

The optical data of the sixth example of the optical imaging lens are shown in FIG. 30 while the aspheric surface data are shown in FIG. 31. In this example, image height=3.400 mm; EFL=3.943 mm; HFOV=40.359 degrees; TTL=5.523 mm; Fno=1.600. In particular, 1. the distortion aberration of the optical imaging lens in this example is better than that of the optical imaging lens in the first example, and 2. the fabrication of this example is easier than that of the first example so the yield is better.

Seventh Example

Figure 18:
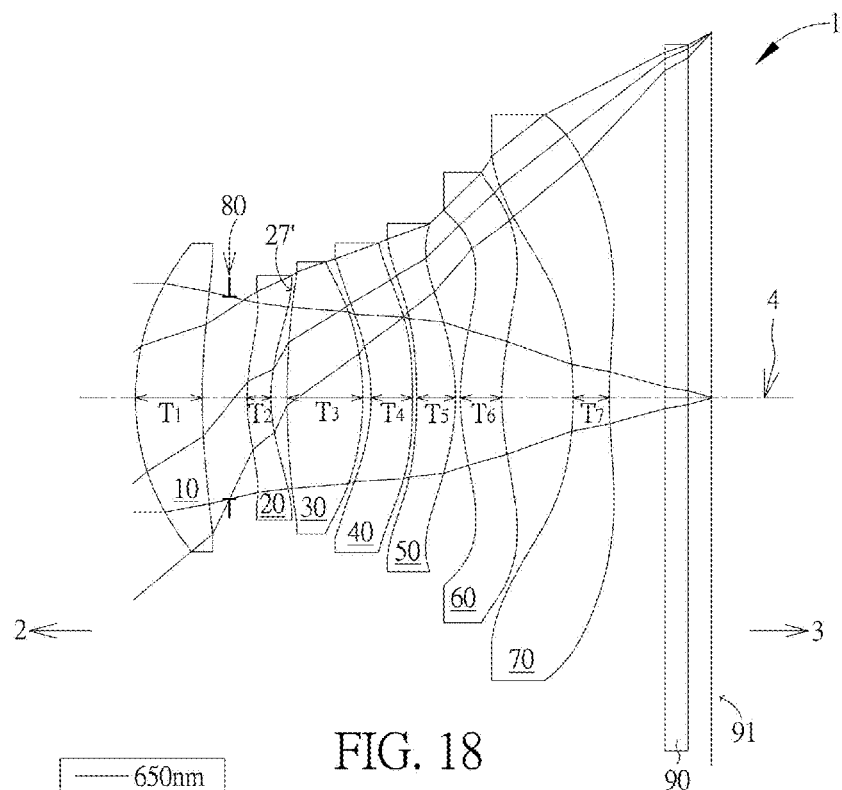
FIG. 18 illustrates a seventh example of the optical imaging lens of the present invention.
Figures 19A, 19B, 19C, 19D:
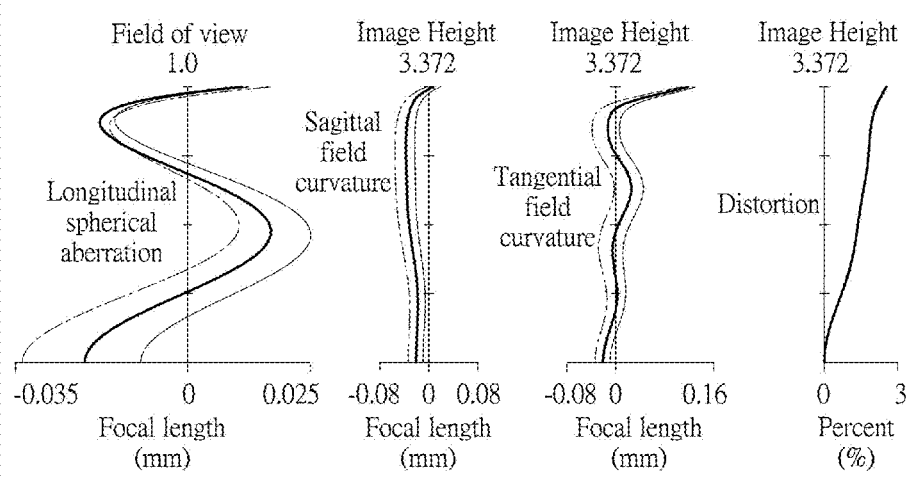
FIG. 19A illustrates the longitudinal spherical aberration on the image plane of the seventh example.
FIG. 19B illustrates the field curvature on the sagittal direction of the seventh example.
FIG. 19C illustrates the field curvature on the tangential direction of the seventh example.
FIG. 19D illustrates the distortion of the seventh example.

Please refer to FIG. 18 which illustrates the seventh example of the optical imaging lens 1 of the present invention. Please refer to FIG. 19A for the longitudinal spherical aberration on the image plane 91 of the seventh example; please refer to FIG. 19B for the field curvature on the sagittal direction; please refer to FIG. 19C for the field curvature on the tangential direction, and please refer to FIG. 19D for the distortion. The components in this example are similar to those in the first example, but the optical data such as the curvature radius, the lens thickness, the aspheric surface or the back focal length in this example are different from the optical data in the first example. Besides, in this example, the aperture stop 80 is provided between the first lens element 10 and the second lens element 20 to facilitate a larger field of view and better imaging quality, and the periphery region 27' of the image-side surface 22 of the second lens element 20 facing toward the image side 3 is convex.

The optical data of the seventh example of the optical imaging lens are shown in FIG. 32 while the aspheric surface data are shown in FIG. 33. In this example, image height=3.372 mm; EFL=3.891 mm; HFOV=40.000 degrees; TTL=5.285 mm; Fno=1.800. In particular, 1. the distortion aberration of the optical imaging lens in this example is better than that of the optical imaging lens in the first example, and 2. the fabrication of this example is easier than that of the first example so the yield is better.

Some important ratios in each example are shown in FIG. 34 and in FIG. 35.

The applicant found that by the following designs matched with each other, the lens configuration of the present invention has the advantages of enhancing viewing angle, enlarging the aperture, shortening the length of the optical imaging lens and enhancing object definition and achieving good image quality:

1. The concave optical-axis region of the object-side surface of the fourth lens element is advantageous to correct the aberration which is cause by the first lens element to the third lens element.
2. The concave periphery region of the image-side surface of the fifth lens element is advantageous to reduce the total length of the optical imaging lens of seven lens elements.
3. The concave optical-axis region of the image-side surface of the sixth lens element is advantageous to correct the entire aberration of the optical system.
4. Satisfying the conditional formula AAG/G12≤10.000 facilitates the reduction of the length of lens system as well as the better arrangement of the optical imaging system. The preferable range is 3.000≤AAG/G12≤10.000.

In addition, the inventor further discovers that there are some better ratio ranges for different optical data according to the above various important ratios. Better optical ratio ranges help the designers to design a better optical performance and an effectively reduce length of a practically possible optical imaging lens set:

(a) In order to diminish the total length of the optical imaging lens, the present invention proposes to properly reduce the lens thickness and air gaps between adjacent lens elements. Taking both the assembly fabrication and imaging quality into consideration, the lens thickness and the air gaps should be coordinated with each other, or to adjust the ratio of particular optical parameters to a specific combination of lens groups. The following conditional formulae help the optical imaging lens system have better arrangement:

(G23+G34+G45+G56)/T7≤2.000, the preferable range is 0.700≤(G23+G34+G45+G56)/T7≤2.000;

(T1+T6)/(T4+T5)≤1.700, the preferable range is 1.200≤(T1+T6)/(T4+T5)≤1.700;

T3/T2≤5.500, the preferable range is 2.200≤T3/T2≤5.500;

ALT/T3≤4.700, the preferable range is 3.100≤ALT/T3≤4.700;

T4/G12≤2.000, the preferable range is 0.800≤T4/G12≤2.000;

AAG/BFL≤1.800, the preferable range is 1.200≤AAG/BFL≤1.800;

(T2+G67)/(T1+G12)≤1.300, the preferable range is 0.200≤(T2+G67)/(T1+G12)≤1.300;

(T3+G34+T4+G45+T5)/(T6+G67+T7)≤1.700, the preferable range is 0.700≤(T3+G34+T4+G45+T5)/(T6+G67+T7)≤1.700;

(T2+T6)/T7≤2.200, the preferable range is 0.700≤(T2+T6)/T7≤2.200;

G67/T4≤2.200, the preferable range is 1.200≤G67/T4≤2.200;

AAG/T5≤4.500, the preferable range is 3.400≤AAG/T5≤4.500;

(G23+G34+G45+G56)/T2≤2.100, the preferable range is 1.100≤(G23+G34+G45+G56)/T2≤2.100;

ALT/(T6+G67)≤3.800, the preferable range is 2.100≤ALT/(T6+G67)≤3.800.

(b) The optical parameters and the total length of the optical imaging lens together keep a suitable range so the parameters are not too small to fabricate or so great to increase the total length of the optical imaging lens. If the following conditional formulae are satisfied, the optical imaging lens system may have better arrangement:

TL/(T5+T6)≤7.500, the preferable range is 4.400≤TL/(T5+T6)≤7.500;

TTL/BFL≤6.200, the preferable range is 5.400≤TTL/BFL≤6.200;

TL/(T3+T7)≤4.500, the preferable range is 2.700≤TL/(T3+T7)≤4.500;

TTL/(T1+G12)≤6.600, the preferable range is 5.000≤TTL/(T1+G12)≤6.600.

(c) Decreasing EFL helps to increase the viewing angle, so EFL is designed to be smaller. If the following conditional formulae are satisfied, they may help increase the viewing angle while reducing the thickness of the optical system:

EFL/BFL≤5.200, the preferable range is 3.800≤EFL/BFL≤5.200;

EFL/T1≤7.200, the preferable range is 6.000≤EFL/T1≤7.200.

In the light of the unpredictability of the optical imaging lens, the present invention suggests the above principles to have a shorter total length of the optical imaging lens, a larger aperture available, better imaging quality or a better fabrication yield to overcome the drawbacks of prior art.

In each one of the above examples, the longitudinal spherical aberration, the field curvature and the distortion meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the field curvature and the distortion. In addition, by observing the imaging quality data the distances amongst the three representing different wavelengths (red, green and blue) are pretty close to one another, which means the present invention is able to concentrate light of the three representing different wavelengths so that the aberration is greatly improved. Given the above, the present invention provides outstanding imaging quality.

In addition to the above ratios, one or more conditional formulae may be optionally combined to be used in the examples of the present invention and the present invention is not limit to this.

The maximum and minimum numeral values derived from the combinations of the optical parameters disclosed in the embodiments of the invention may all be applicable and enable people skill in the pertinent art to implement the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, a fifth lens element, a sixth lens element and a seventh lens element, wherein the first lens element to the seventh lens element each has an object-side surface facing toward the object side to allow an imaging ray to pass through as well as an image-side surface facing toward the image side to allow the imaging ray to pass through, wherein:

an optical-axis region of the object-side surface of the fourth lens element is concave;
   a periphery region of the image-side surface of the fifth lens element is concave; and
   an optical-axis region of the image-side surface of the sixth lens element is concave;
   the lens elements having refracting power included by the optical imaging lens are only the seven lens elements described above, wherein, AAG is a sum of total six air gaps from the first lens element to the seventh lens element and G12 is an air gap between the first lens element and the second lens element, and the optical imaging lens satisfies the relationship: AAG/G12≤10.000.

2. The optical imaging lens of claim 1, wherein T7 is a thickness of the seventh lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis and G56 is an air gap between the fifth lens element and the sixth lens element along the optical axis, and the optical imaging lens satisfies the relationship: (G23+G34+G45+G56)/T7≤2.000.

3. The optical imaging lens of claim 1, wherein EFL is an effective focal length of the optical imaging lens and BFL is a distance from the image-side surface of the seventh lens element to an image plane along the optical axis, and the optical imaging lens satisfies the relationship: EFL/BFL≤5.200.

4. The optical imaging lens of claim 1, wherein T1 is a thickness of the first lens element along the optical axis, T4 is a thickness of the fourth lens element along the optical axis, T5 is a thickness of the fifth lens element along the optical axis and T6 is a thickness of the sixth lens element along the optical axis, and the optical imaging lens satisfies the relationship: (T1+T6)/(T4+T5)≤1.700.

5. The optical imaging lens of claim 1, wherein T2 is a thickness of the second lens element along the optical axis and T3 is a thickness of the third lens element along the optical axis, and the optical imaging lens satisfies the relationship: T3/T2≤5.500.

6. The optical imaging lens of claim 1, wherein ALT is a sum of thickness of all the seven lens elements along the optical axis and T3 is a thickness of the third lens element along the optical axis, and the optical imaging lens satisfies the relationship: ALT/T3≤4.700.

7. The optical imaging lens of claim 1, wherein T4 is a thickness of the fourth lens element along the optical axis and G12 is an air gap between the first lens element and the second lens element along the optical axis, and the optical imaging lens satisfies the relationship: T4/G12≤2.000.

8. The optical imaging lens of claim 1, wherein TL is a distance from the object-side surface of the first lens element to the image-side surface of the seventh lens element along the optical axis, T5 is a thickness of the fifth lens element along the optical axis and T6 is a thickness of the sixth lens element along the optical axis, and the optical imaging lens satisfies the relationship: TL/(T5+T6)≤7.500.

9. The optical imaging lens of claim 1, wherein AAG is a sum of six air gaps from the first lens element to the seventh lens element along the optical axis and BFL is a distance from the image-side surface of the seventh lens element to an image plane along the optical axis, and the optical imaging lens satisfies the relationship: AAG/BFL≤1.800.

10. The optical imaging lens of claim 1, wherein T1 is a thickness of the first lens element along the optical axis, T2 is a thickness of the second lens element along the optical axis, G12 is an air gap between the first lens element and the second lens element along the optical axis and G67 is an air gap between the sixth lens element and the seventh lens element along the optical axis, and the optical imaging lens satisfies the relationship: (T2+G67)/(T1+G12)≤1.300.

11. The optical imaging lens of claim 1, wherein TTL is a distance from the object-side surface of the first lens element to an imaging plane along the optical axis and BFL is a distance from the image-side surface of the seventh lens element to an image plane along the optical axis, and the optical imaging lens satisfies the relationship: TTL/BFL≤6.200.

12. The optical imaging lens of claim 1, wherein T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, T7 is a thickness of the seventh lens element along the optical axis, G34 is an air gap between the third lens element and the fourth lens element along the optical axis, G45 is an air gap between the fourth lens element and the fifth lens element along the optical axis and G67 is an air gap between the sixth lens element and the seventh lens element along the optical axis, and the optical imaging lens satisfies the relationship: (T3+G34+T4+G45+T5)/(T6+G67+T7)≤1.700.

13. The optical imaging lens of claim 1, wherein T2 is a thickness of the second lens element along the optical axis, T6 is a thickness of the sixth lens element along the optical axis and T7 is a thickness of the seventh lens element along the optical axis, and the optical imaging lens satisfies the relationship: (T2+T6)/T7≤2.200.

14. The optical imaging lens of claim 1, wherein EFL is an effective focal length of the optical imaging lens and T1 is a thickness of the first lens element along the optical axis, and the optical imaging lens satisfies the relationship: EFL/T1≤7.200.

15. The optical imaging lens of claim 1, wherein T4 is a thickness of the fourth lens element along the optical axis and G67 is an air gap between the sixth lens element and the seventh lens element along the optical axis, and the optical imaging lens satisfies the relationship: G67/T4≤2.200.

16. The optical imaging lens of claim 1, wherein AAG is a sum of six air gaps from the first lens element to the seventh lens element along the optical axis and T5 is a thickness of the fifth lens element along the optical axis, and the optical imaging lens satisfies the relationship: AAG/T5≤4.500.

17. The optical imaging lens of claim 1, wherein T2 is a thickness of the second lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis and G56 is an air gap between the fifth lens element and the sixth lens element along the optical axis, and the optical imaging lens satisfies the relationship: (G23+G34+G45+G56)/T2≤2.100.

18. The optical imaging lens of claim 1, wherein TL is a distance from the object-side surface of the first lens element to the image-side surface of the seventh lens element along the optical axis, T3 is a thickness of the third lens element along the optical axis and T7 is a thickness of the seventh lens element along the optical axis, and the optical imaging lens satisfies the relationship: TL/(T3+T7)≤4.500.

19. The optical imaging lens of claim 1, wherein TTL is a distance from the object-side surface of the first lens element to an imaging plane along the optical axis, T1 is a thickness of the first lens element along the optical axis and G12 is an air gap between the first lens element and the second lens element along the optical axis, and the optical imaging lens satisfies the relationship: TTL/(T1+G12)≤6.600.

20. The optical imaging lens of claim 1, wherein ALT is a sum of thickness of all the seven lens elements along the optical axis, T6 is a thickness of the sixth lens element along the optical axis and G67 is an air gap between the sixth lens element and the seventh lens element along the optical axis, and the optical imaging lens satisfies the relationship: ALT/(T6+G67)≤3.800.

\* \* \* \* \*